(12) United States Patent
Lim et al.

(10) Patent No.: US 8,707,119 B2
(45) Date of Patent: Apr. 22, 2014

(54) APPARATUS FOR TRANSMITTING AND RECEIVING DOWNLINK HARQ FEEDBACK AND ITS METHOD

(75) Inventors: Dong Guk Lim, Anyang-si (KR); Jin Sam Kwak, Anyang-si (KR); Han Gyu Cho, Anyang-si (KR)

(73) Assignee: LG Electronics Inc., Seoul (KR)

( * ) Notice: Subject to any disclaimer, the term of this patent is extended or adjusted under 35 U.S.C. 154(b) by 166 days.

(21) Appl. No.: 13/503,638

(22) PCT Filed: Oct. 25, 2010

(86) PCT No.: PCT/KR2010/007345
§ 371 (c)(1),
(2), (4) Date: Apr. 23, 2012

(87) PCT Pub. No.: WO2011/049420
PCT Pub. Date: Apr. 28, 2011

(65) Prior Publication Data
US 2012/0218923 A1    Aug. 30, 2012

Related U.S. Application Data

(60) Provisional application No. 61/254,208, filed on Oct. 23, 2009.

(30) Foreign Application Priority Data

Oct. 25, 2010 (KR) ............ 10-2010-0104310

(51) Int. Cl.
H04W 72/04 (2009.01)
G08C 25/02 (2006.01)
H04J 1/00 (2006.01)

(52) U.S. Cl.
USPC ............ 714/748; 370/281; 370/338; 370/343

(58) Field of Classification Search
USPC ......... 370/276, 278, 281, 293, 328, 343, 344, 370/310, 312, 330, 338, 329; 714/748, 749, 714/750
See application file for complete search history.

(56) References Cited

U.S. PATENT DOCUMENTS 8,209,576 B2 * 6/2012 Zhang ........................... 714/748
8,239,723 B2 * 8/2012 Zhang et al. .................. 714/749

(Continued)

FOREIGN PATENT DOCUMENTS

KR    10-2009-0078724    7/2009

OTHER PUBLICATIONS

Guosen Yue et al., "Hybrid ARQ Protocols and Signaling for DL and UL Transmissions", IEEE 802.16 Broadband Wireless Access Working Group, IEEE C802.16m-08/334, May 2008.

(Continued)

Primary Examiner — Ahmed Elallam
(74) Attorney, Agent, or Firm — Lee, Hong, Degerman, Kang & Waimey

(57) ABSTRACT

A terminal unit for receiving a hybrid automatic retransmission request (HARQ) feedback using a frequency division duplex (FDD) frame comprises: a receiver, which receives an uplink assignment information element (A-MAP IE) for allocating each uplink through each downlink subframe of a first frame from a base station; a processor, which performs a process for transmitting uplink data that corresponds to the received A-MAP IE for allocating each uplink for a predetermined processing time: a transmitter, which transmits the processed uplink data to the base station from the respective downlink subframes having received the A-MAP IE for allocating each uplink, through each corresponding uplink subframe, after the predetermined processing time has lapsed; and a receiver, which receives, from the base station, the downlink HARQ feedback for each uplink data through each uplink subframe that has, in a third frame, the same index as the index of each downlink subframe where the A-MAP IE for allocating each uplink has been transmitted, wherein the frame is composed of 5, 6 or 7 subframes.

14 Claims, 14 Drawing Sheets

(56) References Cited

U.S. PATENT DOCUMENTS

| | | | | |
|---|---|---|---|---|
| 8,284,720 B2* | 10/2012 | Lee et al. | | 370/329 |
| 8,341,481 B2* | 12/2012 | Lee et al. | | 714/748 |
| 8,498,228 B2* | 7/2013 | Lee et al. | | 370/310 |
| 2010/0278093 A1* | 11/2010 | Wang et al. | | 370/312 |
| 2011/0013543 A1* | 1/2011 | Lim et al. | | 370/281 |

OTHER PUBLICATIONS

Hassen Yaghoobi, "Mobile WiMAX Update and IEEE 802.16m", Intel Corporation, Mar. 2009.

Anna Larmo et al., "The LTE Link-Layer Design", IEEE Communications Magazine, Apr. 2009.

* cited by examiner

APPARATUS FOR TRANSMITTING AND RECEIVING DOWNLINK HARQ FEEDBACK AND ITS METHOD

CROSS-REFERENCE TO RELATED APPLICATIONS

This application is the National Stage filing under 35 U.S.C. 371 of International Application No. PCT/KR2010/007345, filed on Oct. 25, 2010, which claims the benefit of earlier filing date and right of priority to Korean Application No. 10-2010-0104310, filed on Oct. 25, 2010, and also claims the benefit of U.S. Provisional Application Ser. No. 61/254,208, filed on Oct. 23, 2009, the contents of which are all incorporated by reference herein in their entirety.

TECHNICAL FIELD

The present invention relates to a wireless communication, and more particularly, to HARQ timing.

BACKGROUND ART

In IEEE (institute of electrical and electronics engineers) 802.16m system for example of AAI (advance air interface frame) system, a frame consists of a plurality of subframes and each of the subframes consists of a plurality of subcarriers on a frequency axis and a plurality of OFDM symbols on a time axis. Some of a plurality of subframes included in one frame are used to transmit uplink (UL) data and the rest are used to transmit DL data. In the following description, a frame structure of IEEE 802.16m system is schematically explained.

FIG. 1 is a diagram of a basic frame structure in IEEE (institute of electrical and electronics engineers) 802.16m system.

Referring to FIG. 1, each 20 ms superframe is divided into 4 5 ms frames in equal size. The 5 ms frame has a channel bandwidth amounting to one of 5 MHz, 10 MHz and 20 MHz. and, each 5 ms radio frame may consist of 8 subframes in accordance with the channel bandwidth.

One subframe may be allocated to downlink (DL) transmission or uplink (UL) transmission. One subframe may consist of OFDMA (orthogonal frequency division multiple access) symbols of which number varies in accordance with a channel bandwidth. A $1^{st}$ type subframe may be defined as the subframe consisting of 6 OFDMA symbols, a $2^{nd}$ type subframe may be defined as the subframe consisting of 7 OFDMA symbols, and a $3^{rd}$ type subframe may be defined as the subframe consisting of 5 OFDMA symbols.

The hybrid automatic retransmission request (hereinafter abbreviated HARQ) means an advanced automatic retransmission request scheme of performing decoding in a manner of combining originally transmitted information and retransmitted information together to decrease a count of transmissions due to error occurrence in initial data transmission. This hybrid automatic retransmission request (HARQ) scheme corresponds to a technique used not only for IEEE 802.16m system but also for other mobile communication systems. For the HARQ feedback scheme, IEEE 802.16m system has only proposed a case that one frame consists of 8 subframes.

However, in case that one frame consists of 5, 6 or 7 subframes in IEEE 802.16m system, it is impossible to apply the related art HARQ feedback scheme. Therefore, the demand for a method of HARQ feedback for such a case is rising.

DISCLOSURE OF THE INVENTION

Technical Tasks

One object of the present invention is to provide a method of providing a method of receiving a DL HARQ feedback.

Another object of the present invention is to provide a method of transmitting a DL HARQ feedback.

Another object of the present invention is to provide a mobile station apparatus for receiving a DL HARQ feedback.

A further object of the present invention is to provide a base station apparatus for transmitting a DL HARQ feedback.

Technical tasks obtainable from the present invention may be non-limited by the above mentioned technical tasks. And, other unmentioned technical tasks can be clearly understood from the following description by those having ordinary skill in the technical field to which the present invention pertains.

Technical Solutions

To achieve these and other advantages and in accordance with the purpose of the present invention, as embodied and broadly described, a method of receiving DL (downlink) HARQ (hybrid automatic retransmission request) feedback at a mobile station using FDD (frequency division duplex) frame, according to the present invention includes the steps of receiving each UL Assignment A-MAP IE (uplink assignment information element) via each DL subframe of a first frame from a base station, transmitting UL data corresponding to the received each UL Assignment A-MAP IE via each UL subframe after elapse of a preset processing time necessary for the mobile station process the UL data transmission from the each DL subframe used in receiving the each UL Assignment A-MAP IE, and receiving the DL HARQ feedback for the each UL data from the base station via each DL subframe having the same index of the each DL subframe used in transmitting the each UL Assignment A-MAP IE in a third frame, wherein the frame includes 5 subframes, 6 subframes or 7 subframes.

Preferably, the processing time is represented by a subframe number unit and the processing time may amount to 3 subframes.

Preferably, a bandwidth of the FDD frame is 5 MHz, 10 MHz, 20 MHz or 8.75 MHz and a CP (cyclic prefix) time of the FDD frame may include one of ¼ of a useful symbol time, ⅛ of the useful symbol time and ¹⁄₁₆ of the useful symbol time.

To further achieve these and other advantages and in accordance with the purpose of the present invention, a method of transmitting DL (downlink) HARQ (hybrid automatic retransmission request) feedback at a base station using FDD (frequency division duplex) frame, according to the present invention includes the steps of transmitting each UL Assignment A-MAP IE (uplink assignment information element) via each DL subframe of a first frame to a mobile station, receiving each UL data corresponding to the transmitted each UL Assignment A-MAP IE via each UL subframe after elapse of a preset processing time necessary for the mobile station process the UL data transmission from the each DL subframe used in transmitting the each UL Assignment A-MAP IE, and transmitting the DL HARQ feedback for the received each UL data via each DL subframe having the same index of the each UL subframe used in transmitting the each UL Assignment A-MAP IE in a third frame, wherein the frame includes 5 subframes, 6 subframes or 7 subframes.

Preferably, the processing time is represented by a subframe number unit and the processing time may amount to 3 subframes.

To further achieve these and other advantages and in accordance with the purpose of the present invention, a mobile station for receiving DL (downlink) HARQ (hybrid automatic retransmission request) feedback using FDD (frequency division duplex) frame, according to the present invention includes a receiver configured to receive each UL Assignment A-MAP IE (uplink assignment information element) via each DL subframe of a first frame from a base station, a processor configured to perform a processing for a UL data transmission corresponding to the received each UL Assignment A-MAP IE for a preset processing time, a transmitter configured to transmit the processed UL data via each corresponding UL subframe after elapse of the preset processing time from the each DL subframe used in receiving the each UL Assignment A-MAP IE, and wherein the receiver is further configured to receive the DL HARQ feedback for the each UL data from the base station via each DL subframe having the same index of the each DL subframe used in transmitting the each UL Assignment A-MAP IE in a third frame, wherein the frame includes 5 subframes, 6 subframes or 7 subframes.

Preferably, the processing time is represented by a subframe number unit and the processing time may amount to 3 subframes.

To further achieve these and other advantages and in accordance with the purpose of the present invention, a base station for transmitting DL (downlink) HARQ (hybrid automatic retransmission request) feedback using FDD (frequency division duplex) frame, according to the present invention includes a transmitter configured to transmit each UL Assignment A-MAP IE (uplink assignment information element) via each DL subframe of a first frame to a mobile station, a receiver configured to receive each UL data corresponding to the transmitted each UL Assignment A-MAP IE via each UL subframe after elapse of a preset processing time necessary for the mobile station to process the UL data transmission from the each DL subframe used in transmitting the each UL Assignment A-MAP IE, a processor configured to control the processing time necessary to process the received each UL data and to transmit the DL HARQ feedback for the each UL data in a subframe having the same index of the each DL subframe used in transmitting the each UL Assignment A-MAP IE, and wherein the transmitter is further configured to transmit the DL HARQ feedback via each DL subframe of a $3^{rd}$ frame under the control of the processor, wherein the frame includes 5 subframes, 6 subframes or 7 subframes.

Preferably, the processing time is represented by a subframe number unit and the processing time may amount to 3 subframes.

Advantageous Effects

According to various embodiments of the present invention, even if one frame consists of subframes less than 8 subframes, a communication can be efficiently performed using UL HARQ timing.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE FOR INVENTION

Figure 1:
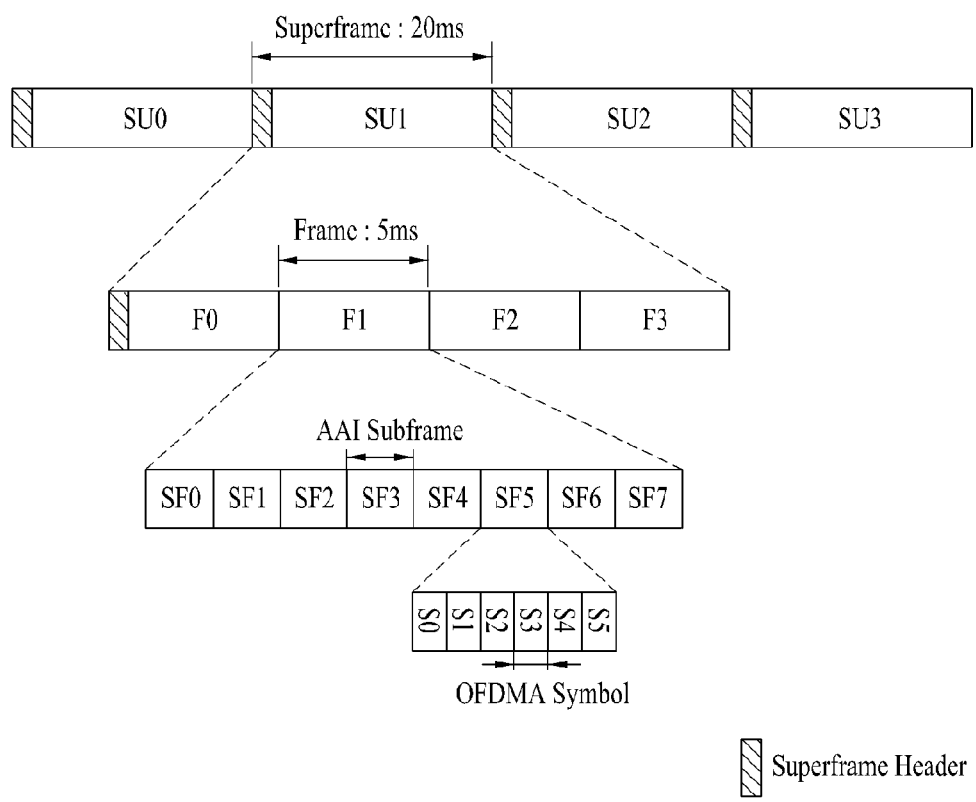
FIG. 1 is a diagram of a basic frame structure in IEEE (institute of electrical and electronics engineers) 802.16m system.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Moreover, a relay may be named one of a relay node (RN), a relay station (RS), a relay and the like.

In a mobile communication system, a user equipment is able to receive information in downlink and is able to transmit information in uplink as well. Informations transmitted or received by the user equipment may include various kinds of data and control informations. In accordance with types and usages of the informations transmitted or received by the user equipment, various physical channels may exist.

In a frame structure of IEEE 802.16m system for example of AAI system, a base station is able to transmit system information, control information and the like to a mobile station using a control channel and is also able to transmit data and the like on the rest of a frame region except the control channel. A control channel for a base station to transmit control information to a mobile station may include a superframe header (SFH), A-MAP (advanced-MAP) and the like. A base station may be able to transmit such control information as A-MAP and the like to a mobile station in each subframe.

The superframe header includes a primary-superframe header (P-SCH) and a secondary-superframe header (S-SFH). The superframe header is the channel used to broadcast system information essential or supplementary to a mobile station. In particular, a base station transmits a superframe header to a mobile station, thereby helping the mobile station to enter a network initially by turning on its power or perform a handover due to its migration.

AAI subframe used by the present invention may indicate a structured data sequence of a previously determine duration used by an AAI (advanced air interface) and may be called a subframe in general. A-MAP (Advanced-MAP) used by the present invention may be transmitted to a mobile station by containing unicast service control information therein. The unicast service control information may be mainly classified into user-specific control information and non-user specific control information. And, the user-specific control information may be subdivided into assignment information, HARQ feedback information and power control information for example.

Figure 2:
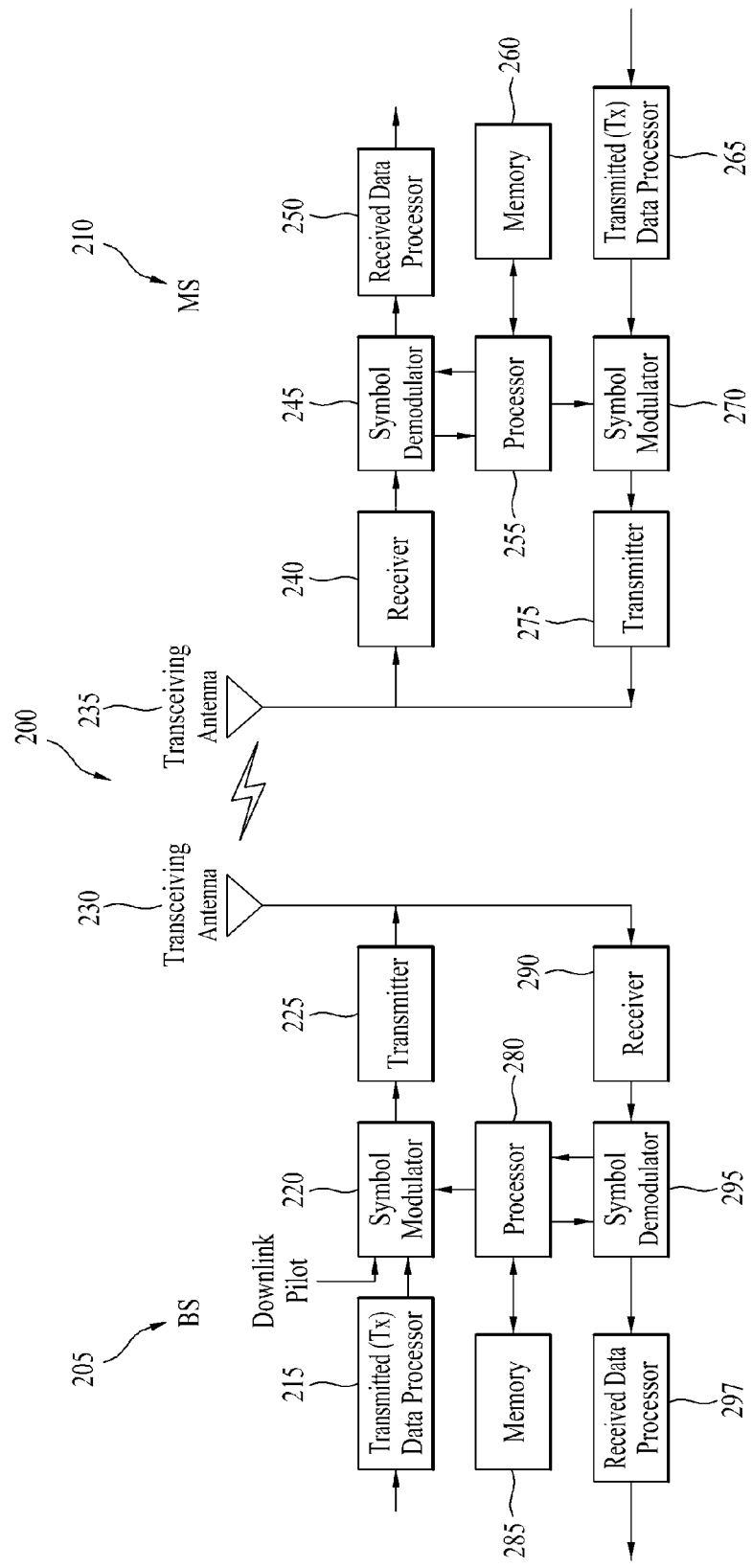
FIG. 2 is a block diagram for configurations of a base station 205 and a mobile station 210 in a wireless communication system 200.

FIG. 2 is a block diagram for configurations of a base station 205 and a mobile station 210 in a wireless communication system 200.

Although one base station 205 and one mobile station 210 are shown in the drawing to schematically represent a wireless communication system 200, the wireless communication system 200 may include at least one base station and/or at least one mobile station.

Referring to FIG. 2, a base station 205 may include a transmitted (Tx) data processor 215, a symbol modulator 220, a transmitter 225, a transceiving antenna 230, a processor 280, a memory 285, a receiver 290, a symbol demodulator 295 and a received data processor 297. And, a mobile station 210 may include a transmitted (Tx) data processor 265, a symbol modulator 270, a transmitter 275, a transceiving antenna 235, a processor 255, a memory 260, a receiver 240, a symbol demodulator 255 and a received data processor 250. Although the base station/mobile station 205/210 includes one antenna 230/235 in the drawing, each of the base station 205 and the mobile station 210 includes a plurality of antennas. Therefore, each of the base station 205 and the mobile station 210 of the present invention supports an MIMO (multiple input multiple output) system. And, the base station 205 according to the present invention may support both SU-MIMO (single user-MIMO) and MU-MIMO (multi user-MIMO) systems.

In downlink, the transmitted data processor 215 receives traffic data, codes the received traffic data by formatting the received traffic data, interleaves the coded traffic data, modulates (or symbol maps) the interleaved data, and then provides modulated symbols (data symbols). The symbol modulator 220 provides a stream of symbols by receiving and processing the data symbols and pilot symbols.

The symbol modulator 220 multiplexes the data and pilot symbols together and then transmits the multiplexed symbols to the transmitter 225. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 225 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the mobile station via the antenna 230.

In the configuration of the mobile station 210, the antenna 235 receives the downlink signal from the base station and then provides the received signal to the receiver 240. The receiver 240 adjusts the received signal (e.g., filtering, amplification and frequency downconverting), digitizes the adjusted signal, and then obtains samples. The symbol demodulator 245 demodulates the received pilot symbols and then provides them to the processor 255 for channel estimation.

The symbol demodulator 245 receives a frequency response estimated value for downlink from the processor 255, performs data demodulation on the received data symbols, obtains data symbol estimated values (i.e., estimated values of the transmitted data symbols), and then provides the data symbols estimated values to the received (Rx) data processor 250. The received data processor 250 reconstructs the transmitted traffic data by performing demodulation (i.e., symbol demapping, deinterleaving and decoding) on the data symbol estimated values.

The processing by the symbol demodulator 245 and the processing by the received data processor 250 are complementary to the processing by the symbol modulator 220 and the processing by the transmitted data processor 215 in the base station 205, respectively.

In the mobile station 210 in uplink, the transmitted data processor 265 processes the traffic data and then provides data symbols. The symbol modulator 270 receives the data symbols, multiplexes the received data symbols, performs modulation on the multiplexed symbols, and then provides a stream of the symbols to the transmitter 275. The transmitter 275 receives the stream of the symbols, processes the received stream, and generates an uplink signal. This uplink signal is then transmitted to the base station 205 via the antenna 135.

In the base station 205, the uplink signal is received from the mobile station 210 via the antenna 230. The receiver 290 processes the received uplink signal and then obtains samples. Subsequently, the symbol demodulator 295 processes the samples and then provides pilot symbols received in uplink and a data symbol estimated value. The received data processor 297 processes the data symbol estimated value and then reconstructs the traffic data transmitted from the mobile station 210.

The processor 255/280 of the mobile station/base station 210/205 directs operations (e.g., control, adjustment, management, etc.) of the mobile station/base station 210/205. The processor 255/280 may be connected to the memory unit 260/285 configured to store program codes and data. The memory 260/285 is connected to the processor 255/280 to store operating systems, applications and general files.

The processor 255/280 may be called one of a controller, a microcontroller, a microprocessor, a microcomputer and the like. And, the processor 255/280 may be implemented using hardware, firmware, software and/or any combinations thereof. In the implementation by hardware, the processor 255/280 may be provided with one of ASICs (application specific integrated circuits), DSPs (digital signal processors), DSPDs (digital signal processing devices), PLDs (programmable logic devices), FPGAs (field programmable gate arrays), and the like.

In case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 255/280 or saved in the memory 260/285 to be driven by the processor 255/280.

Layers of a radio interface protocol between a mobile station and a base station in a wireless communication system (network) may be classified into $1^{st}$ layer (L1), $2^{nd}$ layer (L2) and $3^{rd}$ layer (L3) based on 3 lower layers of OSI (open system interconnection) model well known to communication systems. A physical layer belongs to the $1^{st}$ layer and provides an information transfer service via a physical channel. RRC (radio resource control) layer belongs to the $3^{rd}$ layer and provides control radio resourced between UE and network. A mobile station and a base station may be able to exchange RRC messages with each other via radio communication layer and RRC layers.

Frame indexes and subframe indexes used by the present invention are defined as follows. Generally, since one superframe includes 4 frames in IEEE 802.16m system, an index of a temporally foremost $1^{st}$ frame to an index of a last $4^{th}$ frame are numbered 1 to 3, respectively. As one frame may include 5, 6, 7 or 8 subframes, these subframes are numbered in a manner that a temporally foremost $1^{st}$ subframe is numbered a subframe index 0 in order. Hence, theses subframes are numbered subframe index 0 to subframe index 4, 5, 6 or 7 in accordance with the number of the subframes.

UL HARQ subpacket transmission of a mobile station, which corresponds to UL Assignment A-MAP Information Element (IE) transmitted by a base station in a $1^{st}$ DL subframe of an $i^{th}$ frame, starts with an $m^{th}$ UL subframe of a $j^{th}$ frame. DL HARQ feedback of the base station for the UL HARQ subpacket transmission of the mobile station is transmitted in a $1^{st}$ DL subframe of a $k^{th}$ frame. In case that the DL HARQ feedback indicates NACK (negative acknowledgement), a retransmission of the UL HARQ subpacket starts in an $m^{th}$ UL AAI subframe of a $p^{th}$ frame. AAI subframe index m and frame indexes j, k and p may be calculated as shown in Table 1.

TABLE 1

| Content | AAI Subframe Index | Frame Index |
|---|---|---|
| UL Assignment A-MAP IE Tx | 1 | i |
| UL HARQ Subpacket Tx | $m = \text{ceil}(1 + F/2) \mod F$ | $j = \left(i + \text{floor}\left(\frac{\text{ceil}(1+F/2)}{F}\right) + v\right) \mod 4$ where $v = \begin{cases} 0, & (\text{ceil}(F/2) - 1) \geq T_{UL\_Tx\_Processing} \\ 1, & \text{else} \end{cases}$ |
| DL HARQ feedback | 1 | where $k = \left(j + \text{floor}\left(\frac{(m+F/2)}{F}\right) + w\right) \mod 4$ $w = \begin{cases} 0, & \text{floor}(F/2) - N_{TTI} \geq T_{UL\_Rx\_Processing} \\ 1, & \text{else} \end{cases}$ |
| UL HARQ Subpacket ReTx | m | where $p = \left(k + \text{floor}\left(\frac{\text{ceil}(1+F/2)}{F}\right) + v\right) \mod 4$ $v = \begin{cases} 0, & (\text{ceil}(F/2) - 1) \geq T_{UL\_Tx\_Processing} \\ 1, & \text{else} \end{cases}$ |

In Table 1, the 'F' indicates the number of subframes defined by a frame configuration table. The 'l' indicates a reference (or index) for a DL subframe and is numbered 0 (for $1^{st}$ DL subframe) to F−1 (for last DL subframe) in order. The 'm' indicates a reference (or index) for a UL subframe and is numbered 0 (for $1^{st}$ UL subframe) to F−1 (for last UL subframe) in order. The 'i' indicates a reference (or index) for a frame and is numbered 0 (for $1^{st}$ frame of superframe) to 3 (for $4^{th}$ frame of superframe) in order (i.e., since one superframe includes 4 frames, indexes of the frames are numbered 0 to 3.). The 'j' indicates a reference (or index) (e.g., frames are numbered 0 to 3 by starting with a $1^{st}$ frame of superframe) for a frame with which HARQ subpacket starts in a superframe. The 'k' indicates a reference (or index) (e.g., frames are numbered 0 to 3 by starting with a $1^{st}$ frame of superframe) for a frame in which HARQ feedback (e.g., HARQ ACK/NACK) transmission is transmitted in a superframe. The 'p' indicates a reference (or index) (e.g., frames are numbered 0 to 3 by starting with a $1^{st}$ frame of superframe) for a frame with which HARQ subpacket retransmission starts in a superframe. The 'v' indicates UL HARQ transmission offset. And, the 'w' indicates UL HARQ feedback offset.

Current UL HARQ timing is optimized for a frame structure having a cyclic prefix (CP) amounting to ⅛ length of a useful symbol length for a channel bandwidth of 5/10/20 MHz. In particular, the expressions of UL HARQ timing shown in Table 1 are applicable only to a case that one frame includes 8 subframes. If one frame is configured to include subframes less than 8 subframes, it may cause a problem that the current UL HARQ timing expressions unable to guarantee the processing time.

In this case, the processing time may be classified into a time ($T_{UL\_Tx\_Processing}$) necessary for a mobile station to process a data burst (e.g., a UL HARQ subpacket) transmission and a time ($T_{DL\_Rx\_processing}$) necessary for a base station to process a data burst reception. The base station may be able to transmit DL HARQ feedback for UL HARQ subpacket transmission using a subframe having the same index as a subframe index of the transmitted UL assignment A-MAP IE (Information Element).

If the number of subframes configuring one frame is smaller than 8, a processing time for HARQ feedback in DL should be decreased in order for the base station to transmit DL HARQ feedback via a subframe having the same index as the subframe index, in which the UL Assignment A-MAP IE (information element) is transmitted, using Table 1 as it is.

Table 2 shows all frame configurations in IEEE 802.16m system.

TABLE 2

| Num | BW (MHz) | Length of CP | Number of subframe in frame |
|---|---|---|---|
| 1 | 5/10/20 | ⅛ | 8 |
| 2 | 5/10/20 | 1/16 | 8 |
| 3 | 5/10/20 | ¼ | 7 |
| 4 | 8.75 | ⅛ | 7 |
| 5 | 8.75 | 1/16 | 7 |
| 6 | 8.75 | ¼ | 6 |
| 7 | 7 | ⅛ | 5 |
| 8 | 7 | 1/16 | 6 |
| 9 | 7 | ¼ | 5 |

Referring to Table 2, the number of subframes configured within one frame may vary in accordance with a channel bandwidth and/or CP length of FDD frame. In particular, it is not mandatory for one frame to include 8 subframes.

Table 3 shows frame and subframe indexes for UL HARQ timing if one frame includes 7 subframes in FDD (frequency division duplex) system.

TABLE 3

| Basic Assignment A-Map IE TX in DL | | HARQ Subpacket TX in UL | | HARQ feedback in DL | | HARQ Subpacket ReTX in UL | |
|---|---|---|---|---|---|---|---|
| Subframe index | Frame index | Subframe index | Frame index | Subframe index | Frame index | Subframe index | Frame index |
| 0 | 0 | 4 | 0 | 0 | 1 | 4 | 1 |
| 1 | 0 | 5 | 0 | 1 | 1 | 5 | 1 |
| 2 | 0 | 6 | 0 | 2 | 1 | 6 | 1 |
| 3 | 0 | 0 | 1 | 3 | 2 | 0 | 3 |
| 4 | 0 | 1 | 1 | 4 | 3 | 1 | 0(4) |
| 5 | 0 | 2 | 1 | 5 | 3 | 2 | 0(4) |
| 6 | 0 | 3 | 1 | 6 | 3 | 3 | 0(4) |

Figure 3:
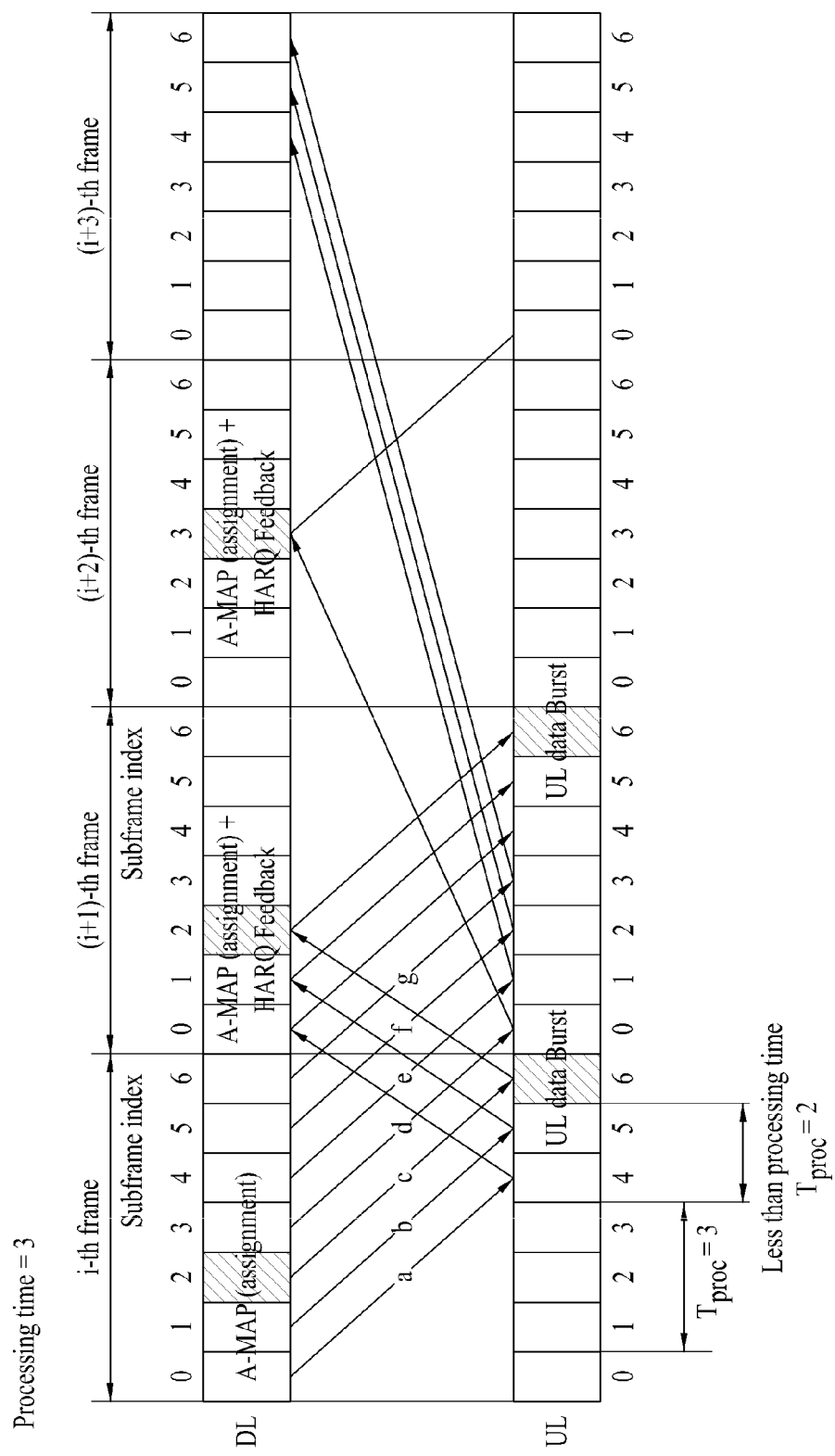
FIG. 3 is a diagram for UL HARQ timing in FDD frame according to Table 3.

FIG. 3 is a diagram for UL HARQ timing in FDD frame according to Table 3.

Referring to FIG. 3, in accordance with a channel bandwidth and/or CP length (or time) of FDD frame, one frame may include 7 subframes. In a previous FDD frame having one frame include 8 subframes, HARQ timing is applied on the assumption that a processing time amounts to 3 subframes. Yet, assuming that a processing time includes 3 subframes in case of an FDD frame having one frame include 7 subframes, subframe and frame indexes for UL HARQ subpacket transmission of a mobile station and DL HARQ feedback of a base station are not identically applicable using Table 1.

For instance, referring to FIG. 3, if a mobile station receives UL Assignment A-MAP IE in a $3^{rd}$ subframe (i.e., subframe index 2) of an $i^{th}$ frame, the mobile station transmits UL HARQ subpacket in a $7^{th}$ subframe (i.e., subframe index 6) of the $i^{th}$ frame after a processing time (i.e., 3 subframes). If so, the mobile station may need to receive DL HARQ feedback for the UL HARQ subpacket transmission from a base station in a $3^{rd}$ subframe (i.e., subframe index 2) of an $(i+1)^{th}$ frame identical to the $3^{rd}$ subframe (i.e., subframe index 2) of the $i^{th}$ frame in which the UL Assignment A-MAP IE was received. Yet, in this case, since an interval between the subframe index 6 of the $i^{th}$ frame and the subframe index 2 of the $(i+1)^{th}$ frame amounts to 2 subframes only, it may cause a problem that the processing time may not be secured.

Hence, if UL HARQ timing in FDD frame having one frame include 7 subframes uses the previous Table 1 as it is, it may cause a problem that a processing time is not secured. In order to solve these problems, the expressions shown in Table 1 need to be modified or a new HARQ timing scheme is required, which will be described in the following.

Even if the number of subframes included in one frame is smaller than 8, a processing time should be secured. Hence, if the processing time is not met, it may be able to use a subframe located in a next frame for HARQ feedback and retransmission.

1st Embodiment of UL HARQ Timing

UL HARQ timing scheme according to a 1st embodiment of the present invention is described. In particular, the present embodiment is described on the assumption that a processing time amounts to 3 subframe intervals. The present embodiment assumes that a scheme of retransmitting UL HARQ subpacket at a subframe index having the same index of a subframe index for transmitting the UL HARQ subpacket of a mobile station is applied.

In UL HARQ timing scheme, after a mobile station has transmitted UL HARQ subpacket (or UL data) to a base station, the base station transmits DL HARQ feedback in response to the UL HARQ subpacket transmission. In dong so, for a subframe failing to meet a processing time, the base station may be able to transmit the DL HARQ feedback via a subframe having the same subframe index of a subframe index of UL Assignment A-MAP IE transmitted in a next frame. This scheme may be found using a following frame offset.

In order for a base station to secure a processing time for DL HARQ feedback, an HARQ feedback offset may need to be considered as an additional parameter for the expression shown in Table 1 for the UL HARQ timing in conjunction with the number of subframes in a frame. This additional HARQ feedback offset parameter may be represented as Formula 1.

$$\alpha = \begin{cases} 1, & \text{if } \frac{\text{ceil}(l + F/2)}{F} < 1 \\ 0, & \text{else} \end{cases}$$ [Formula 1]

In Formula 1, the ceil function is a function of outputting a minimum value among integers equal to or greater than a designated number. The 'F' indicates the number of subframes in one frame defined according to a frame configuration table. And, the 'l' indicates an index of a subframe in which UL Assignment A-MAP IE was transmitted.

This offset may be applicable only if the number of subframes in one frame is smaller than 8. If the number of subframes in one frame is equal to 8, this offset α is 0.

Hence, a frame index for a DL HARQ feedback of a base station in response to a UL HARQ subpacket transmission of a mobile station may be represented as Formula 2 in consideration of the above offset.

$$k = \left(j + \text{floor}\left(\frac{l + (F/2)}{F}\right) + \omega + \alpha\right) \bmod 4$$ [Formula 2]

In Formula 2, the 'k' indicates an index of a frame for a base station to transmit an HARQ feedback (HARQ ACK/NACK) in a superframe, the 'j' indicates an index of a frame for a mobile station to transmit a UL HARQ subpacket in a superframe, the floor function is the function of outputting a maximum value among integers smaller than a designated number, and the 'l' indicates an index of a subframe for transmitting a UL Assignment A-MAP IE. The 'F' indicates the number of subframes in one frame defined according to a frame configuration table. The 'w' indicates a previously defined UL HARQ feedback offset. And, the 'α' is an additional offset parameter.

Table 4 shows indexes of frame and subframe for UL HARQ in case that one frame includes 7 subframes based on Formula 2.

TABLE 4

| Basic Assignment A-Map IE TX in DL | | HARQ Subpacket TX in UL | | HARQ feedback in DL | | HARQ Subpacket ReTX in UL | |
|---|---|---|---|---|---|---|---|
| Subframe index | Frame index | Subframe index | Frame index | Subframe index | Frame index | Subframe index | Frame index |
| 0 | 0 | 4 | 0 | 0 | 2 | 4 | 2 |
| 1 | 0 | 5 | 0 | 1 | 2 | 5 | 2 |
| 2 | 0 | 6 | 0 | 2 | 2 | 6 | 2 |
| 3 | 0 | 0 | 1 | 3 | 2 | 0 | 3 |
| 4 | 0 | 1 | 1 | 4 | 3 | 1 | 0(4) |
| 5 | 0 | 2 | 1 | 5 | 3 | 2 | 0(4) |
| 6 | 0 | 3 | 1 | 6 | 3 | 3 | 0(4) |

Figure 4:
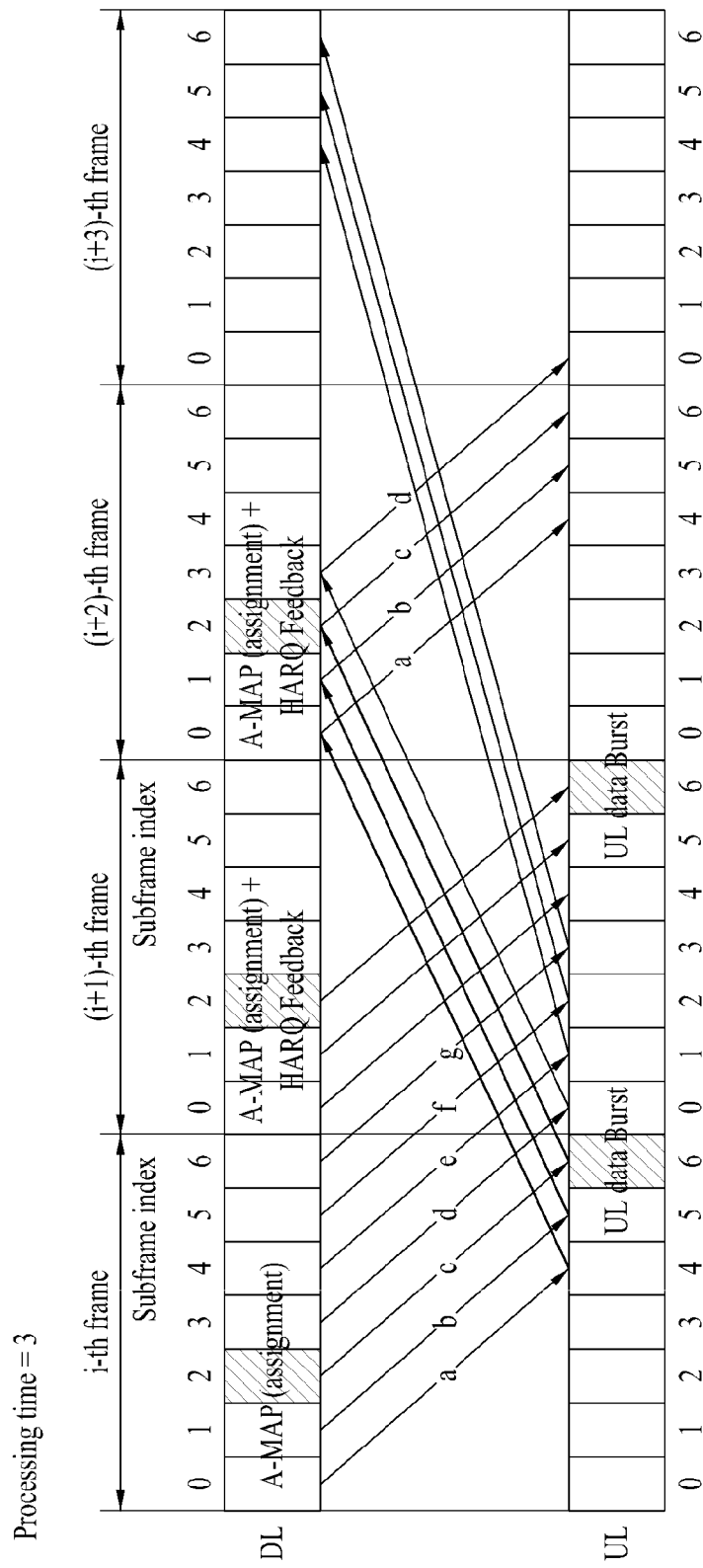
FIG. 4 is a diagram for UL HARQ timing in FDD system having one frame include 7 subframes according to Table 4.

FIG. 4 is a diagram for UL HARQ timing in FDD system having one frame include 7 subframes according to Table 4.

A UL HARQ timing structure shown in FIG. 4 assumes that one frame includes 7 subframes and that a processing time amounts to 3 subframe intervals. And, the present embodiment applies a scheme for a base station to transmit a DL HARQ feedback in response to a UL HARQ subpacket transmission of a mobile station using a subframe having the same index of a subframe used in transmitting UL Assignment A-MAP IE (information element).

In case that one frame includes 7 subframes, according to Formula 2 and Table 4, if a mobile station receives control information (e.g., UL Assignment A-MAP IE) in each of subframe indexes 0 to 6 of an i$^{th}$ frame (i.e., frame index 0) from a base station, the mobile station may be able to transmit UL HARQ subpacket corresponding to the UL Assignment A-MAP IE in subframe index 4 of the i$^{th}$ frame to subframe index 3 of an (i+1)$^{th}$ frame.

And, the base station may be able to transmit a DL HARQ feedback to the mobile station in each of subframe indexes 0 to 3 (1$^{st}$ to 4$^{th}$ subframes) of an (i+2)$^{th}$ frame as subframe indexes equal to the subframe indexes 0 to 3 (1$^{st}$ subframe) of the i$^{th}$ frame in which the UL Assignment A-MAP IE was transmitted. And, the base station may be able to transmit a DL HARQ feedback to the mobile station in each of subframe indexes 4 to 6 of an (i+3)$^{th}$ frame as subframe indexes equal to the subframe indexes 4 to 6 of the $i^{th}$ frame in which the UL Assignment A-MAP IE was transmitted.

Figure 5:
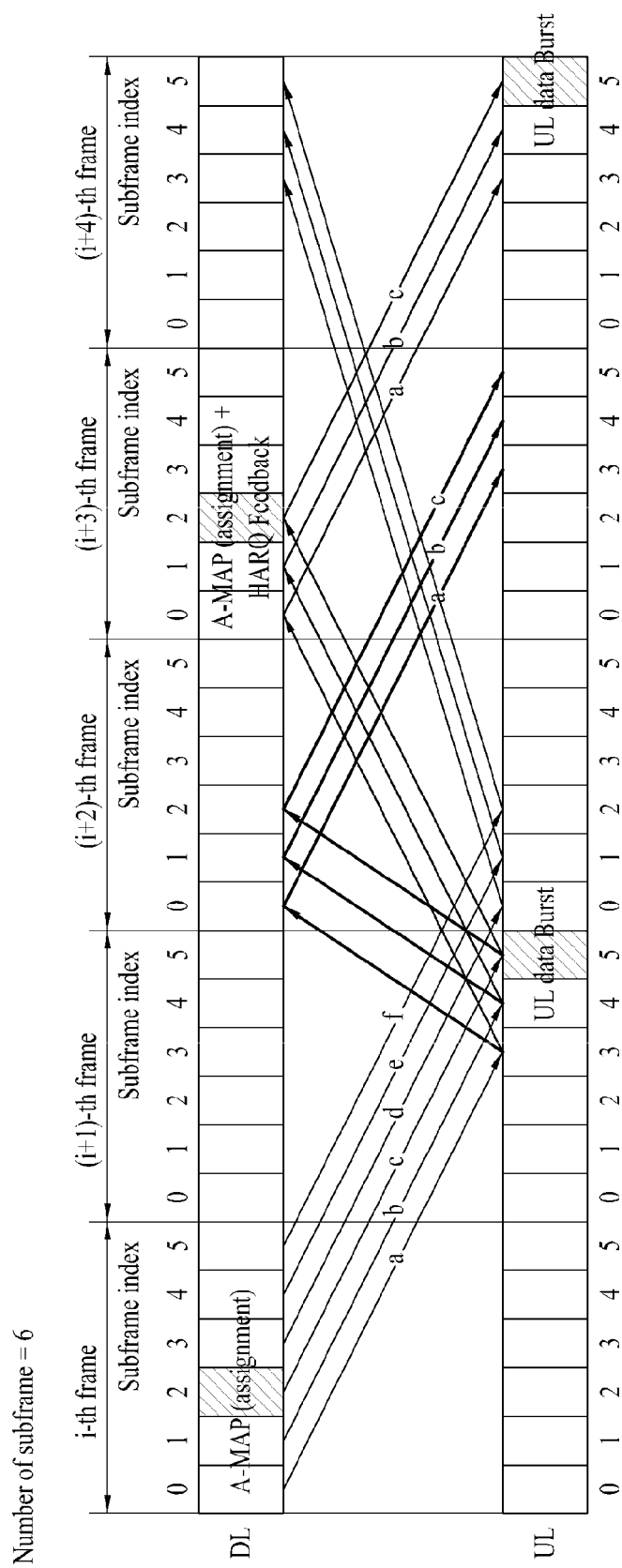
FIG. 5 is a diagram for UL HARQ timing in FDD system having one frame include 6 subframes.

FIG. 5 is a diagram for UL HARQ timing in FDD system having one frame include 6 subframes.

A UL HARQ timing structure shown in FIG. 5 assumes that one frame includes 6 subframes and that a processing time amounts to 3 subframe intervals. Like the case that one frame includes 7 subframes, applied is a scheme for a base station to transmit DL HARQ feedback in response to a UL HARQ subpacket transmission of a mobile station using a subframe having the same index of a subframe used in transmitting UL Assignment A-MAP IE (information element).

A mobile station receives UL Assignment A-MAP IE in each subframe of an $i^{th}$ frame from a base station. And, the mobile station sequentially transmits each UL HARQ subpacket corresponding to the received UL Assignment A-MAP IE in a subframe starting with a $4^{th}$ subframe of an $(i+1)^{th}$ frame to the base station. The base station may be able to transmit DL HARQ feedback for the UL HARQ subpacket transmission in a subframe of the $i^{th}$ frame, which has the same subframe index used in transmitting the UL Assignment A-MAP IE.

In doing so, in case that one frame includes 6 subframes, it may be able to calculate a frame index for transmitting the DL HARQ feedback using Formula 1 and Formula 2. If Formula 1 and Formula 2 are used, the DL HARQ feedback of the base station for the UL HARQ subpacket transmission of the mobile station in response to the UL Assignment A-MAP IE transmitted in each of the subframe indexes 0 to 2 ($1^{st}$ to $3^{rd}$ subframes) of the $i^{th}$ frame is transmitted in an $(i+3)^{th}$ frame (frame index 3). Yet, the DL HARQ feedback for the UL HARQ subpacket transmission of the mobile station in response to the UL Assignment A-MAP IE transmitted in each of the subframe indexes 3 to 5 ($4^{th}$ to $6^{th}$ subframes) of the $i^{th}$ frame is transmitted in an $(i+4)^{th}$ frame (frame index 4).

Figure 6:
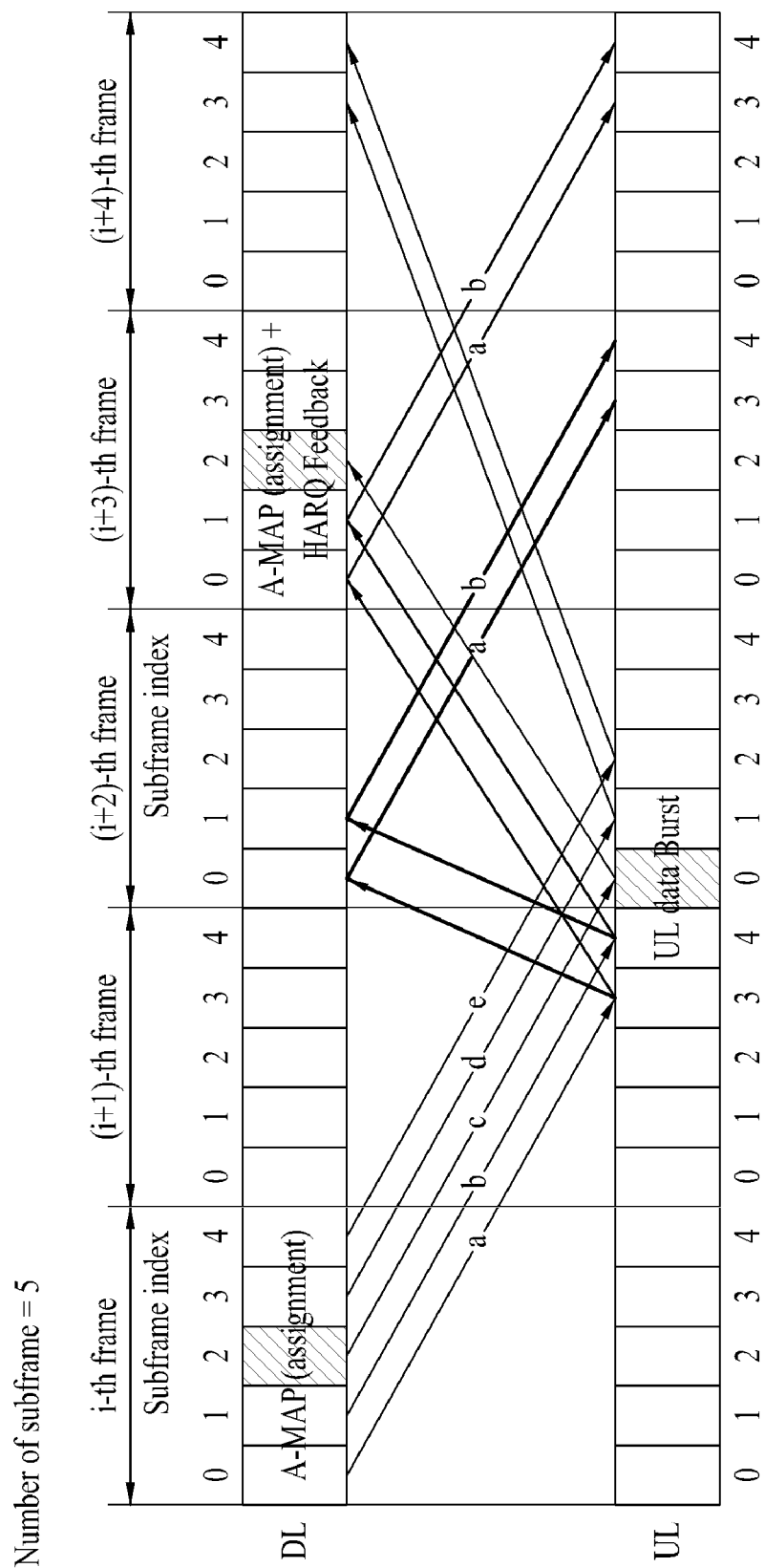
FIG. 6 is a diagram for UL HARQ timing in FDD system having one frame include 5 subframes.

FIG. 6 is a diagram for UL HARQ timing in FDD system having one frame include 5 subframes.

A UL HARQ timing structure shown in FIG. 6 assumes that one frame includes 5 subframes and that a processing time amounts to 3 subframe intervals. Like the case that one frame includes 7 or 6 subframes, applied is a scheme for a base station to transmit DL HARQ feedback in response to a UL HARQ subpacket transmission of a mobile station using a subframe having the same index of a subframe used in transmitting UL Assignment A-MAP IE (information element).

A mobile station receives UL Assignment A-MAP IE in each subframe of an $i^{th}$ frame from a base station. And, the mobile station sequentially transmits each UL HARQ subpacket corresponding to the received UL Assignment A-MAP IE in a subframe starting with a $4^{th}$ subframe of an $(i+1)^{th}$ frame to the base station. The base station may be able to transmit DL HARQ feedback for the UL HARQ subpacket transmission in a subframe of the $i^{th}$ frame, which has the same subframe index used in transmitting the UL Assignment A-MAP IE.

According to Formula 1 and Formula 2, the DL HARQ feedback of the base station for the UL HARQ subpacket transmission of the mobile station in response to the UL Assignment A-MAP IE transmitted in each of the subframe indexes 0 to 2 ($1^{st}$ to $3^{rd}$ subframes) of the $i^{th}$ frame is transmitted in an $(i+3)^{th}$ frame (frame index 3). Yet, the DL HARQ feedback for the UL HARQ subpacket transmission of the mobile station in response to the UL Assignment A-MAP IE transmitted in each of the subframe indexes 3 to 5 ($4^{th}$ to $6^{th}$ subframes) of the $i^{th}$ frame is transmitted in an $(i+4)^{th}$ frame (frame index 4).

$2^{th}$ Embodiment of UL HARQ Timing

UL HARQ timing scheme according to a $2^{nd}$ embodiment of the present invention is described. The following description is made on the assumption that a processing time amounts to 3 subframe intervals. A UL HARQ timing structure according to a $2^{nd}$ embodiment of the present invention for UL HARQ timing is assumed as a structure for a base station to transmit a DL HARQ feedback for a UL HARQ subpacket transmission of a mobile station in a subframe having the same index used in transmitting UL Assignment A-MAP IE (information element).

According to the present embodiment, if an interval between a UL HARQ subpacket transmitted subframe having an HARQ timing corresponding to a $1^{st}$ subframe of a UL Assignment A-MAP IE transmitted frame and a corresponding DL HARQ feedback transmitted subframe of a base station meets a processing time, the base station transmits a DL HARQ feedback in a next frame used in transmitting UL Assignment A-MAP IE. On the contrary, if an interval between a UL HARQ subpacket transmitted subframe having an HARQ timing corresponding to a $1^{st}$ subframe of a UL Assignment A-MAP IE transmitted frame and a corresponding DL HARQ feedback transmitted subframe of a base station does not meet a processing time, the base station sequentially transmits each DL HARQ feedback in a $1^{st}$ subframe of a frame delayed by one frame from a next frame used in transmitting UL Assignment A-MAP IE.

In particular, according to the present embodiment, in case that a base station transmits UL Assignment A-MAP IE to a mobile station using a subframe of a specific frame, the mobile station receives the corresponding signal and then transmits UL HARQ subpacket to the base station using a subframe located at a position that meets a processing time. If the mobile station does not meet the processing time within the frame, the mobile station sequentially transmits UL HARQ subpacket to the base station using a subframe of a next frame.

Figure 7:
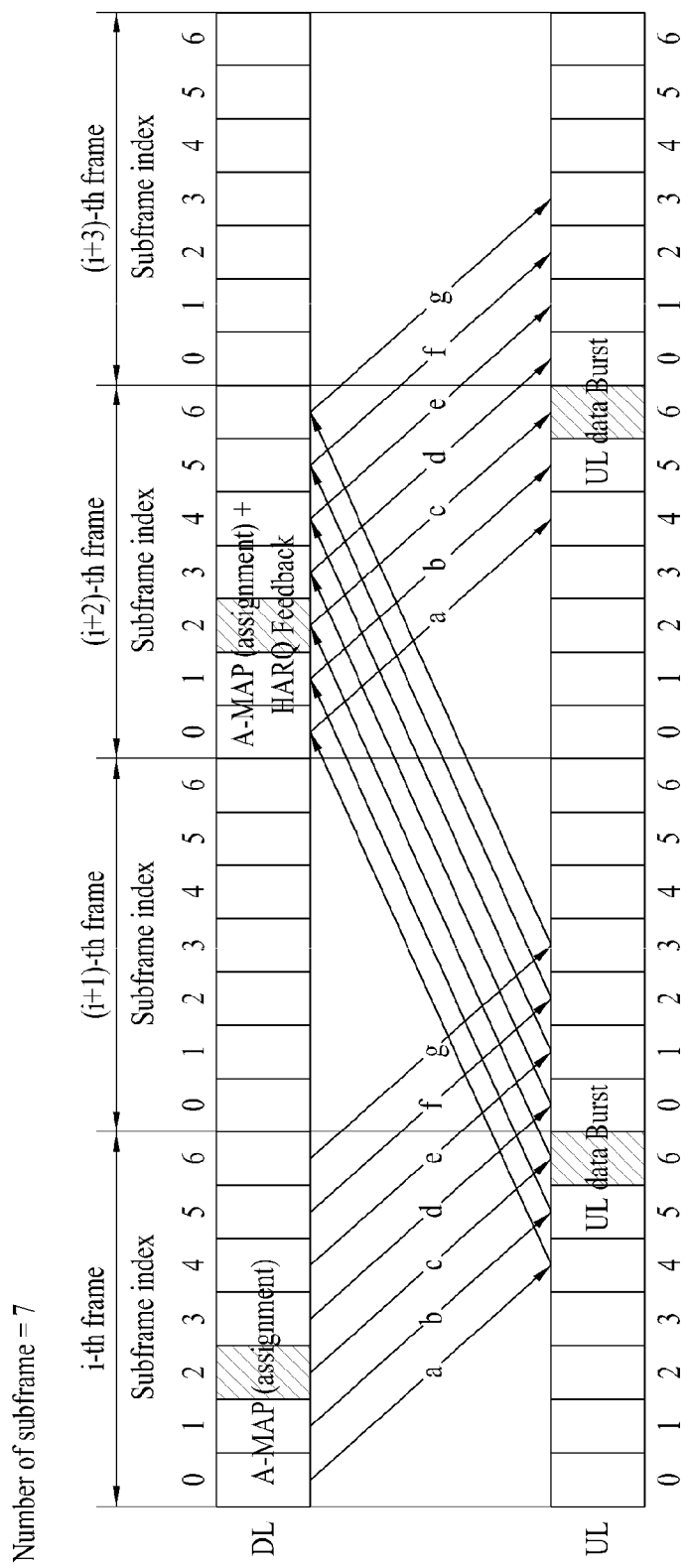
FIG. 7 is a diagram for UL HARQ timing in FDD system having one frame include 7 subframes according to one embodiment of the present invention.

FIG. 7 is a diagram for UL HARQ timing in FDD system having one frame include 7 subframes according to one embodiment of the present invention.

Referring to FIG. 7, assume that a processing time amounts to 3 subframe intervals. An index of a subframe used for DL HARQ feedback by a base station in response to a UL HARQ subpacket (or UL data) transmission of a mobile station is equal to an index of a subframe initially used by the base station in transmitting UL Assignment A-MAP IE. Hence, if an interval between a UL HARQ subpacket transmitted subframe having an HARQ timing corresponding to a $1^{st}$ subframe of an $i^{th}$ frame and a corresponding DL HARQ feedback transmitted subframe of a base station meets a processing time, the base station transmits a DL HARQ feedback in an $(i+1)^{th}$ frame. On the contrary, if an interval between a UL HARQ subpacket transmitted subframe having an HARQ timing corresponding to a $1^{st}$ subframe of an $i^{th}$ frame and a corresponding DL HARQ feedback transmitted subframe of a base station does not meet a processing time, the base station sequentially transmits each DL HARQ feedback in subframes starting with a $1^{st}$ subframe of an $(i+2)^{th}$ frame delayed by one frame.

If an interval between a UL HARQ subpacket transmitted subframe having an HARQ timing corresponding to a $1^{st}$ subframe of an $i^{th}$ frame and a corresponding DL HARQ feedback transmitted subframe of a base station meets a processing time, the base station may be able to transmit a DL HARQ feedback in a subframe, which has the same index of a UL Assignment A-MAP IE transmitted subframe, of an (i+1)$^{th}$ frame. Yet, referring to FIG. 7, since the processing time amounts to 3 subframe intervals and an interval between a 5$^{th}$ subframe of a UL i$^{th}$ frame corresponding to a 1$^{st}$ subframe of an i$^{th}$ frame and a 1$^{st}$ subframe of a DL (i+1)$^{th}$ frame is smaller than a processing time (i.e., an interval amounting to 3 subframes), a base station may be able to transmit HARQ (i+2)$^{th}$ feedback for a UL HARQ subpacket transmission of a mobile station in a DL frame next to the DL (i+1)$^{th}$ frame. In doing so, the base station may be able to transmit the HARQ feedback in a subframe, which has the same index of the subframe used by the base station in transmitting the UL Assignment A-MAP IE, of the (i+2)$^{th}$ frame.

Referring to FIG. 7, a mobile station receives UL Assignment A-MAP IE in a 1$^{st}$ subframe of an i$^{th}$ frame. In doing so, if a processing time is taken into consideration, a UL HARQ subpacket transmitted subframe corresponding to the received UL Assignment A-MAP IE is a 5$^{th}$ subframe of the i$^{th}$ frame. Since an interval between the 5$^{th}$ subframe of the i$^{th}$ frame and a 1$^{st}$ subframe of an (i+1)$^{th}$ frame amounts to 2 subframes only, it may not be able to meet the processing time.

In this situation, if the mobile station receives UL Assignment A-MAP IE in each subframe of the i$^{th}$ frame, the base station sequentially transmit DL HARQ feedback in subframes starting with a 1$^{st}$ subframe of an (i+2)$^{th}$ frame.

Figure 8:
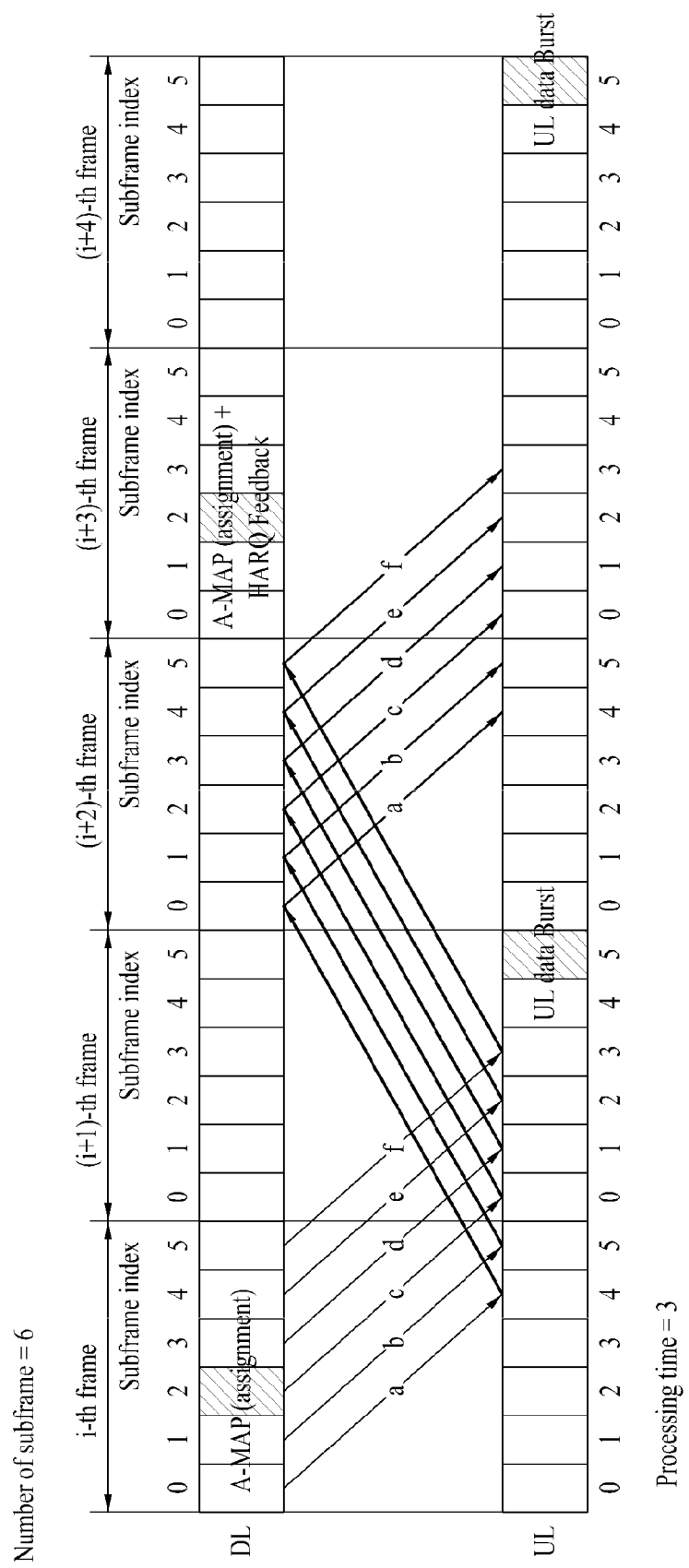
FIG. 8 is a diagram for UL HARQ timing in FDD system having one frame include 6 subframes according to one embodiment of the present invention.

FIG. 8 is a diagram for UL HARQ timing in FDD system having one frame include 6 subframes according to one embodiment of the present invention.

Referring to FIG. 8, assume that a processing time amounts to 3 subframe intervals. In case that one frame includes 6 subframes, a 1$^{st}$ subframe (subframe index 0) of an i$^{th}$ frame in downlink transmits and receives data by forming an HARQ link with a 5$^{th}$ subframe of the i$^{th}$ frame in consideration of a processing time. In this case, a DL HARQ feedback of a base station in response to a UL HARQ subpacket (or UL data) transmission of a mobile station is transmitted in a subframe having the same index of a subframe initially used by the base station in transmitting a UL Assignment A-MAP IE.

Hence, if an interval between a UL HARQ subpacket transmitted subframe having an HARQ timing corresponding to a 1$^{st}$ subframe of an i$^{th}$ frame and a corresponding DL HARQ feedback transmitted subframe of a base station meets a processing time, the base station may be able to transmit each DL HARQ feedback in a subframe, which has the same index of a UL Assignment A-MAP IE transmitted subframe, of an (i+1)$^{th}$ frame.

Yet, referring to FIG. 8, since the processing time amounts to 3 subframe intervals and an interval between a 5$^{th}$ subframe of the i$^{th}$ frame corresponding to the 1$^{st}$ subframe of the i$^{th}$ frame and a 1$^{st}$ subframe of an (i+1)$^{th}$ frame is smaller than the processing time (i.e., an interval amounting to 3 subframes), a frame for an HARQ feedback is delayed by one frame. In this case, if the base station transmits a UL Assignment A-MAP IE in each subframe of the i$^{th}$ frame to the mobile station, the base station sequentially transmit the DL HARQ feedback in a subframe starting with a 1$^{st}$ subframe of an (i+2)$^{th}$ frame.

Figure 9:
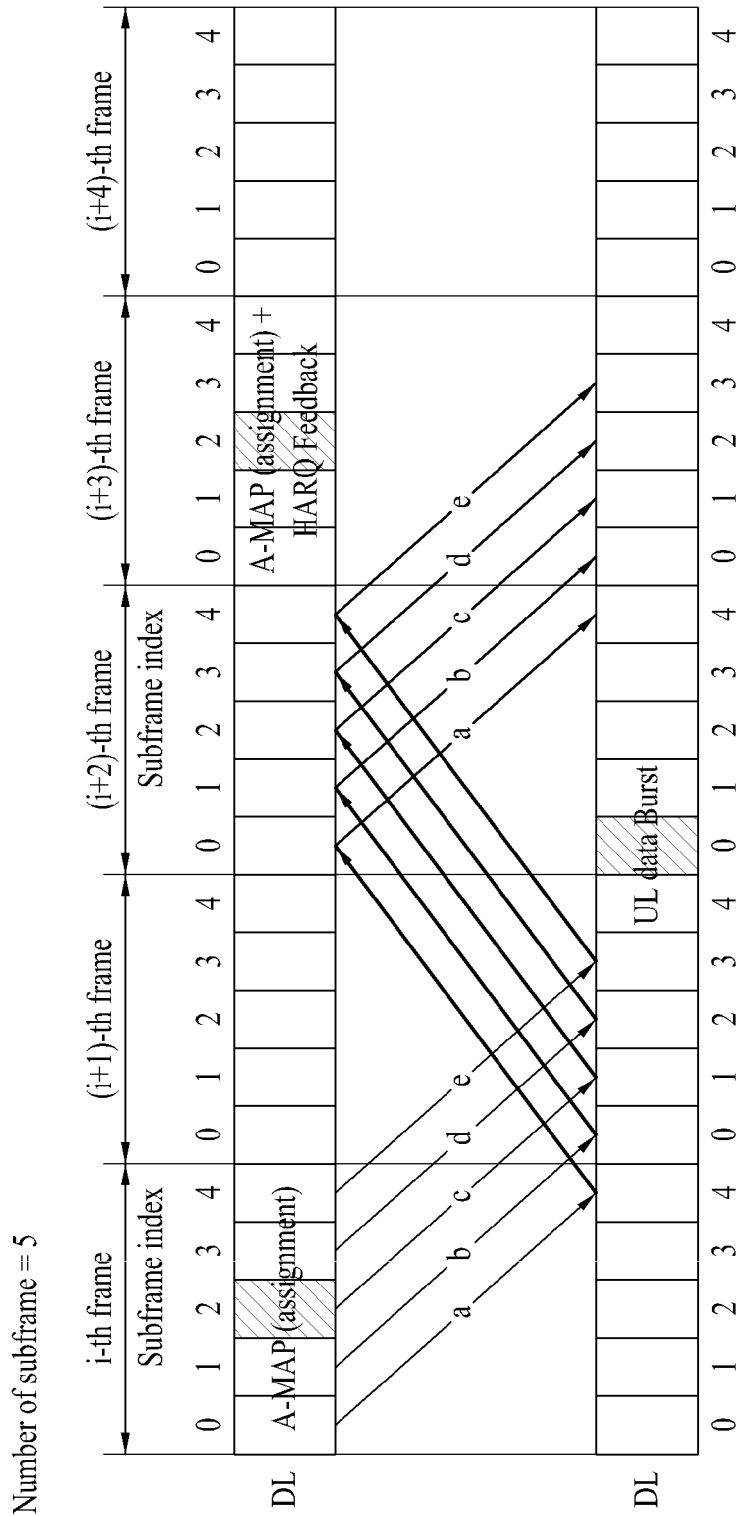
FIG. 9 is a diagram for UL HARQ timing in FDD system having one frame include 5 subframes according to one embodiment of the present invention.

FIG. 9 is a diagram for UL HARQ timing in FDD system having one frame include 5 subframes according to one embodiment of the present invention.

Referring to FIG. 9, assume that a processing time amounts to 3 subframe intervals. In case that one frame includes 5 subframes, a 1$^{st}$ subframe (subframe index 0) of an i$^{th}$ frame in downlink transmits and receives data by forming an HARQ link with a 5$^{th}$ subframe of the i$^{th}$ frame in consideration of a processing time. In this case, a DL HARQ feedback of a base station in response to a UL HARQ subpacket (or UL data) transmission of a mobile station is transmitted in a subframe having the same index of a subframe initially used by the base station in transmitting a UL Assignment A-MAP IE.

Hence, if an interval between a UL HARQ subpacket transmitted subframe having an HARQ timing corresponding to a 1$^{st}$ subframe of an i$^{th}$ frame and a corresponding DL HARQ feedback transmitted subframe of a base station meets a processing time, the base station may be able to transmit each DL HARQ feedback in a subframe, which has the same index of a UL Assignment A-MAP IE transmitted subframe, of an (i+1)$^{th}$ frame.

Yet, referring to FIG. 8, since the processing time amounts to 3 subframe intervals and an interval between a 5$^{th}$ subframe of the i$^{th}$ frame corresponding to the 1$^{st}$ subframe of the i$^{th}$ frame and a 1$^{st}$ subframe of an (i+1)$^{th}$ frame is smaller than the processing time (i.e., an interval amounting to 3 subframes), a frame for an HARQ feedback is delayed by one frame. In this case, if the base station transmits a UL Assignment A-MAP IE in each subframe of the i$^{th}$ frame to the mobile station, the base station sequentially transmit the DL HARQ feedback in a subframe starting with a 1$^{st}$ subframe of an (i+2)$^{th}$ frame.

3$^{rd}$ Embodiment of UL HARQ Timing

UL HARQ timing scheme according to one embodiment of the present invention is described. In particular, the present embodiment is also described on the assumption that a processing time amounts to 3 subframe intervals. And, the present embodiment applies the scheme in a following manner that a base station transmits a DL HARQ feedback via a subframe having the same index of a subframe in which a UL Assignment A-MAP IE was transmitted. Moreover, according to the present embodiment, assume that UL frame index and UL subframe index for transmitting a UL HARQ subpacket of a mobile station are calculated based on Formula 3 and Formula 4.

A mobile station sequentially receives UL Assignment A-MAP IE in a subframe starting with a 1$^{st}$ subframe of an i$^{th}$ frame from a base station. If so, the mobile station transmits a UL HARQ subpacket corresponding to the received UL Assignment A-MAP IE via a UL subframe. According to the present embodiment, frame and subframe indexes for a mobile station to transmit a UL HARQ subpacket may be represented as Formula 3 and Formula 4 as expressions shown in Table 1.

$$j = \left(i + \text{floor}\left(\frac{\text{ceil}(l+F/2)}{F}\right) + v\right) \bmod 4 \qquad \text{[Formula 3]}$$

where $$v = \begin{cases} 0, & (\text{ceil}(F/2) - 1) \geq T_{UL\_Tx\_Processing} \\ 1, & \text{else} \end{cases}$$

In Table 3, the 'j' indicates an index of a frame in which a UL HARQ subpacket starts in a superframe and the 'i' indicates an index of a frame in which UL Assignment A-MAP IE is transmitted. The floor function is the function of outputting a maximum value among integers smaller than a designated number and the ceil function is a function of outputting a minimum value among integers equal to or greater than a designated number. The 'l' indicates an index of a subframe in which a UL Assignment A-MAP IE was transmitted. And, the 'F' indicates the number of subframes in one frame defined according to a frame configuration table. The 'v' indicates a UL HARQ transmission offset and the 'mod' indicates a modulo operation. The $T_{UL\_Tx\_Processing}$ means a time taken for a base station to process a UL HARQ subpacket (or data burst) received from a mobile station.

$$m = \text{ceil}(l+F/2) \bmod F \quad \text{[Formula 4]}$$

The 'm' indicates an index of a subframe in which an HARQ subpacket starts in a frame and the ceil function is a function of outputting a minimum value among integers equal to or greater than a designated number. The 'l' indicates an index of a subframe in which a UL Assignment A-MAP IE was transmitted. And, the 'F' indicates the number of subframes in one frame defined according to a frame configuration table. The "mod" indicates a modulo operation.

Table 5 shows UL HARQ timing in case that one frame includes 7 subframes in FDD (frequency division duplex) system.

TABLE 5

| Basic Assignment A-Map IE TX in DL | | HARQ Subpacket TX in UL | | HARQ feedback in DL | | HARQ Subpacket ReTX in UL | |
|---|---|---|---|---|---|---|---|
| Subframe index | Frame index | Subframe index | Frame index | Subframe index | Frame index | Subframe index | Frame index |
| 0 | 0 | 4 | 0 | 0 | 2 | 4 | 2 |
| 1 | 0 | 5 | 0 | 1 | 2 | 5 | 2 |
| 2 | 0 | 6 | 0 | 2 | 2 | 6 | 2 |
| 3 | 0 | 0 | 1 | 3 | 2 | 0 | 3 |
| 4 | 0 | 1 | 1 | 4 | 2 | 1 | 3 |
| 5 | 0 | 2 | 1 | 5 | 2 | 2 | 3 |
| 6 | 0 | 3 | 1 | 6 | 2 | 3 | 3 |

Referring to Table 5, indexes of frame and subframe for a UL HARQ subpacket transmission of a mobile station are represented using Formula 3 and Formula 4. Based on the indexes of frame and subframe for a UL HARQ subpacket transmission of a mobile station and a processing time necessary for a base station to process a UL HARQ subpacket (or data burst) received from the mobile station, a frame index of a DL HARQ feedback is calculated to enable the DL HARQ feedback of the base station to be transmitted in a subframe having the same index of the subframe used in transmitting a UL Assignment A-MAP IE.

Figure 10:
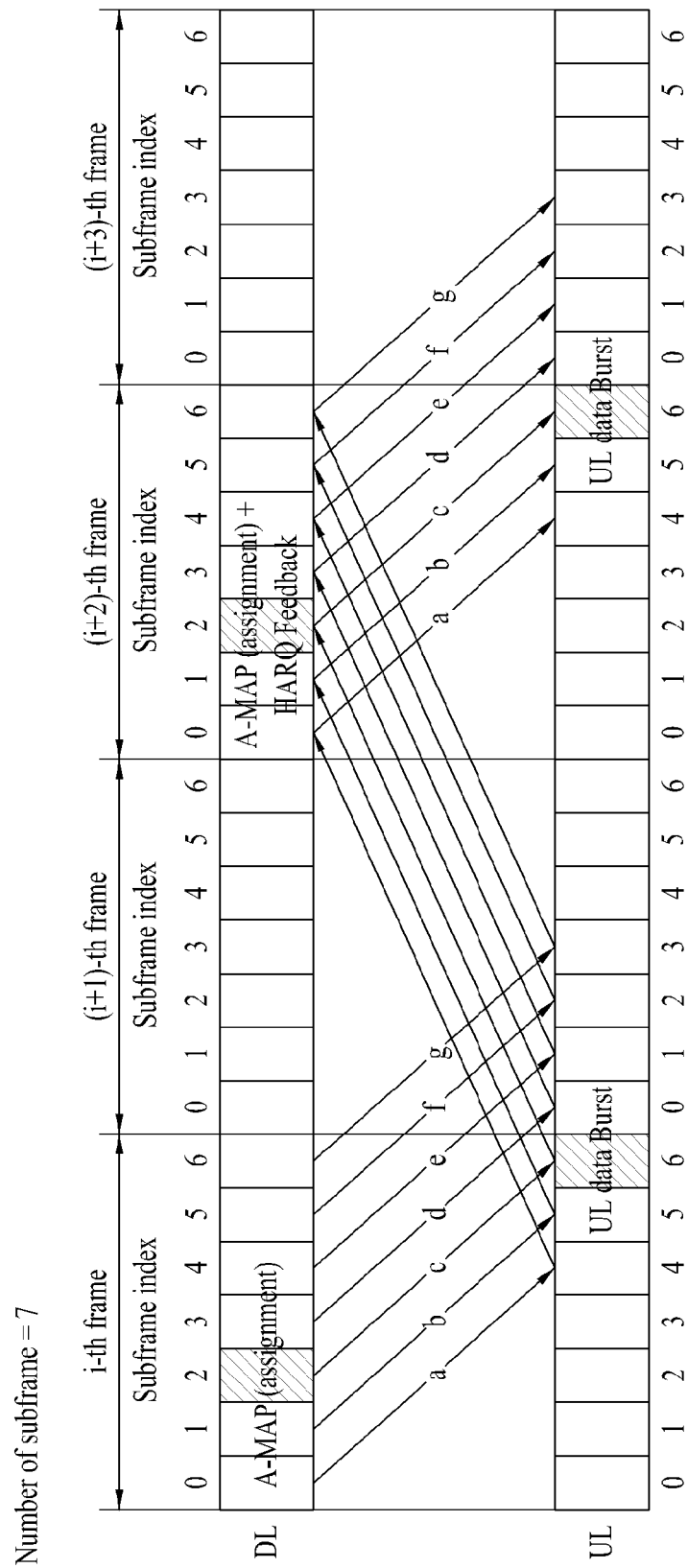
FIG. 10 is a diagram for UL HARQ timing in FDD system having one frame include 7 subframes according to one embodiment of the present invention.

FIG. 10 is a diagram for UL HARQ timing in FDD system having one frame include 7 subframes according to one embodiment of the present invention.

Referring to FIG. 10, a mobile station receives a UL Assignment A-MAP IE in each subframe of an $i^{th}$ frame. Subsequently, the mobile station transmits a UL HARQ subpacket corresponding to the received UL Assignment A-MAP IE in the $i^{th}$ frame. In doing so, indexes of frame and subframe for transmitting the UL HARQ subpacket are calculated by Formula 3 and Formula 4. According to Formula 3 and Formula 4, the mobile station sequentially transmits a UL HARQ subpacket in a subframe starting with a $5^{th}$ subframe of the $i^{th}$ frame.

Indexes of frame and subframe for a DL HARQ feedback of a base station are calculated based on the indexes of the frame and subframe for the UL HARQ subpacket transmission of the mobile station and a processing time taken for the base station to process the UL HARQ subpacket (or data burst) received from the mobile station. In doing so, the indexes of the frame and subframe for the DL HARQ feedback of the base station may be calculated to enable the DL HARQ feedback of the base station to be transmitted in a subframe having the same index of the subframe used in transmitting the UL Assignment A-MAP IE. In this case, the base station may be able to transmit the DL HARQ feedback for the UL HARQ subpacket transmission of the mobile station in an $(i+2)^{th}$ frame. In doing so, the base station transmits the DL HARQ feedback in a subframe having the same index of the subframe used in transmitting the UL Assignment A-MAP IE.

Figure 11:
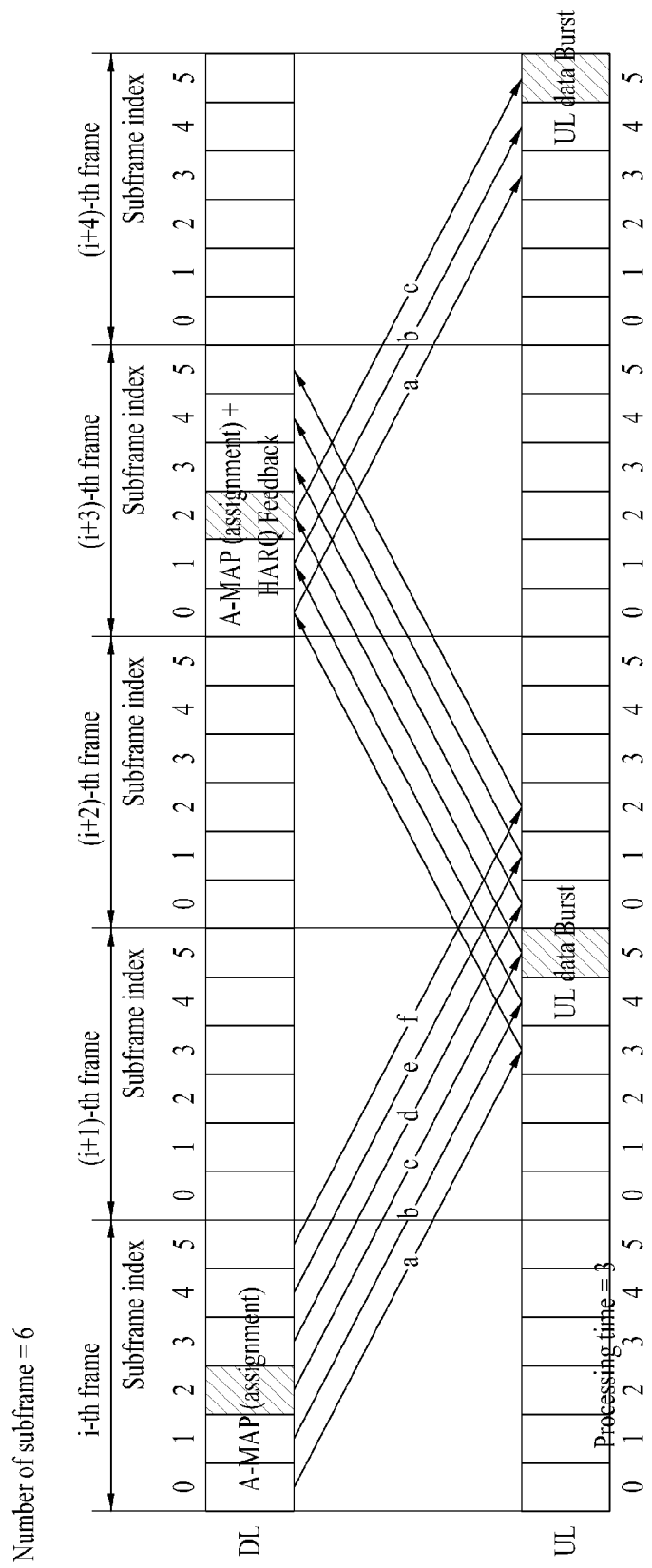
FIG. 11 is a diagram for UL HARQ timing in FDD system having one frame include 6 subframes according to one embodiment of the present invention.

FIG. 11 is a diagram for UL HARQ timing in FDD system having one frame include 6 subframes according to one embodiment of the present invention.

Referring to FIG. 11, a mobile station receives a UL Assignment A-MAP IE in each subframe of an $i^{th}$ frame. Subsequently, the mobile station transmits a UL HARQ subpacket corresponding to the received UL Assignment A-MAP IE in the $i^{th}$ frame. In doing so, indexes of frame and subframe for transmitting the UL HARQ subpacket are calculated by Formula 3 and Formula 4. According to Formula 3 and Formula 4, the mobile station sequentially transmits a UL HARQ subpacket in a subframe starting with a $4^{th}$ subframe of the $i^{th}$ frame.

Like FIG. 10, indexes of frame and subframe for a DL HARQ feedback of a base station are calculated based on the indexes of the frame and subframe for the UL HARQ subpacket transmission of the mobile station and a processing time taken for the base station to process the UL HARQ subpacket (or data burst) received from the mobile station. In doing so, the indexes of the frame and subframe for the DL HARQ feedback of the base station may be calculated to enable the DL HARQ feedback of the base station to be transmitted in a subframe having the same index of the subframe used in transmitting the UL Assignment A-MAP IE.

In this case, the base station may be able to transmit the DL HARQ feedback for the UL HARQ subpacket transmission of the mobile station in an $(i+3)^{th}$ frame. In doing so, the base station transmits the DL HARQ feedback in a subframe having the same index of the subframe used in transmitting the UL Assignment A-MAP IE.

Figure 12:
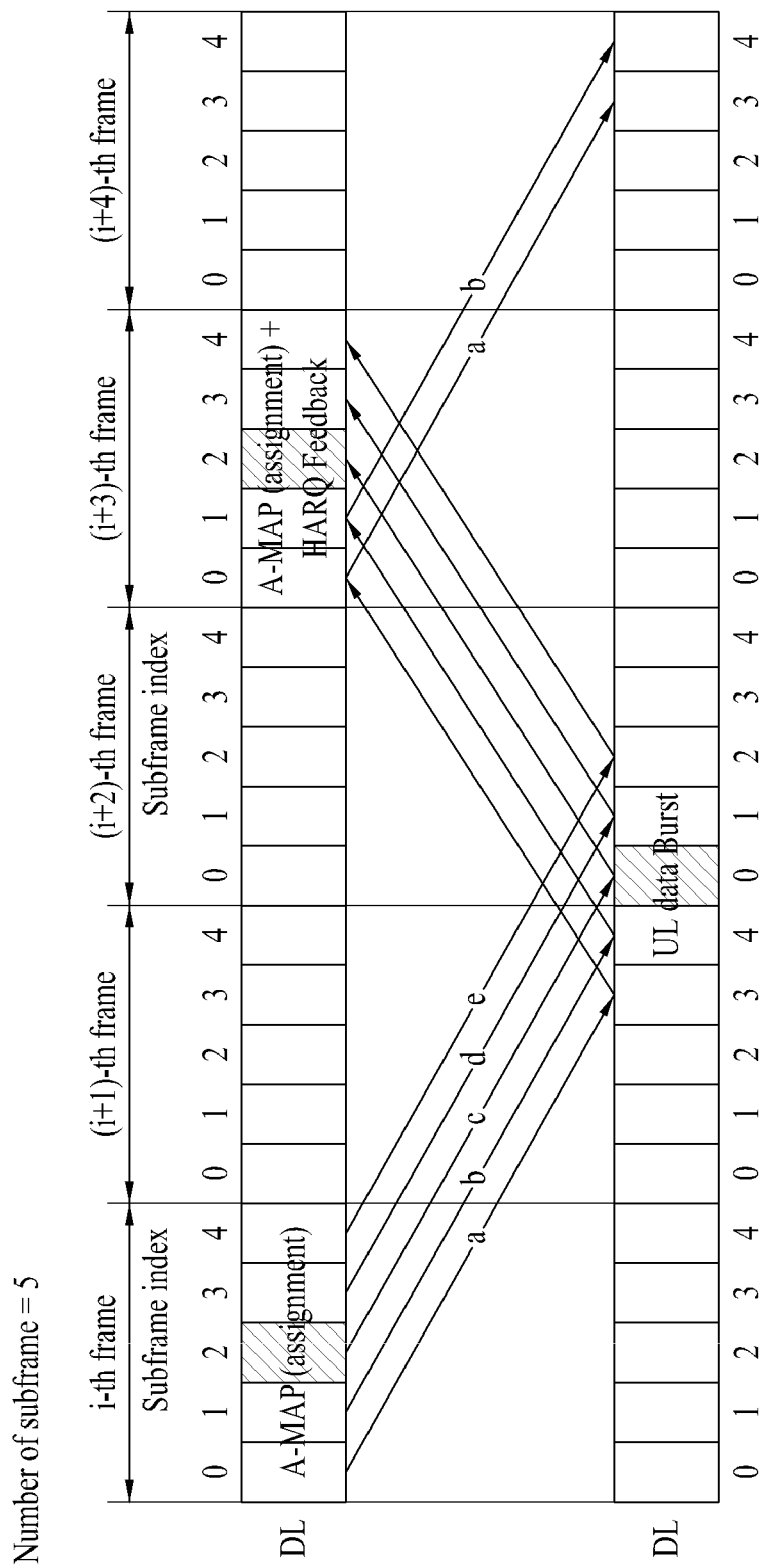
FIG. 12 is a diagram for UL HARQ timing in FDD system having one frame include 5 subframes according to one embodiment of the present invention.

FIG. 12 is a diagram for UL HARQ timing in FDD system having one frame include 5 subframes according to one embodiment of the present invention.

Referring to FIG. 12, a mobile station receives a UL Assignment A-MAP IE in each subframe of an $i^{th}$ frame. Subsequently, the mobile station transmits a UL HARQ subpacket corresponding to the received UL Assignment A-MAP IE in the $i^{th}$ frame. In doing so, indexes of frame and subframe for transmitting the UL HARQ subpacket are calculated by Formula 3 and Formula 4. According to Formula 3 and Formula 4, the mobile station sequentially transmits a UL HARQ subpacket in a subframe starting with a $4^{th}$ subframe of the $i^{th}$ frame.

Like FIG. 10 or FIG. 11, indexes of frame and subframe for a DL HARQ feedback of a base station are calculated based on the indexes of the frame and subframe for the UL HARQ subpacket transmission of the mobile station and a processing time taken for the base station to process the UL HARQ subpacket (or data burst) received from the mobile station. In doing so, the indexes of the frame and subframe for the DL HARQ feedback of the base station may be calculated to enable the DL HARQ feedback of the base station to be transmitted in a subframe having the same index of the subframe used in transmitting the UL Assignment A-MAP IE.

In this case, the base station may be able to transmit the DL HARQ feedback for the UL HARQ subpacket transmission of the mobile station in an $(i+3)^{th}$ frame. In doing so, the base station transmits the DL HARQ feedback in a subframe having the same index of the subframe used in transmitting the UL Assignment A-MAP IE.

$4^{th}$ Embodiment of UL HARQ Timing

UL HARQ timing scheme according to one embodiment of the present invention is described. The present embodiment is also described on the assumption that a processing time amounts to 3 subframe intervals. The present embodiment applies a scheme of retransmitting a UL HARQ subpacket in a subframe having the same index of a subframe used in transmitting the UL HARQ subpacket of a mobile station.

When a mobile station receives a UL Assignment A-MAP IE via a $1^{st}$ subframe of an $i^{th}$ frame, an HARQ link with a subframe of a UL frame is formed in consideration of a processing time. In this case, a UL HARQ subpacket transmitted by the mobile station is matched with a DL subframe in consideration of the processing time to from a link for a UL transmission. Since subframes are matched in consideration of a processing time only in DL/UL, it may happen that a subframe for downloading a UL HARQ subpacket and a subframe for downloading a DL HARQ feedback in DL differs from each other in index. Yet, a retransmission of a UL HARQ subpacket of a mobile station needs to be performed in a subframe having the same index of a subframe used in transmitting the UL HARQ subpacket initially.

Figure 13:
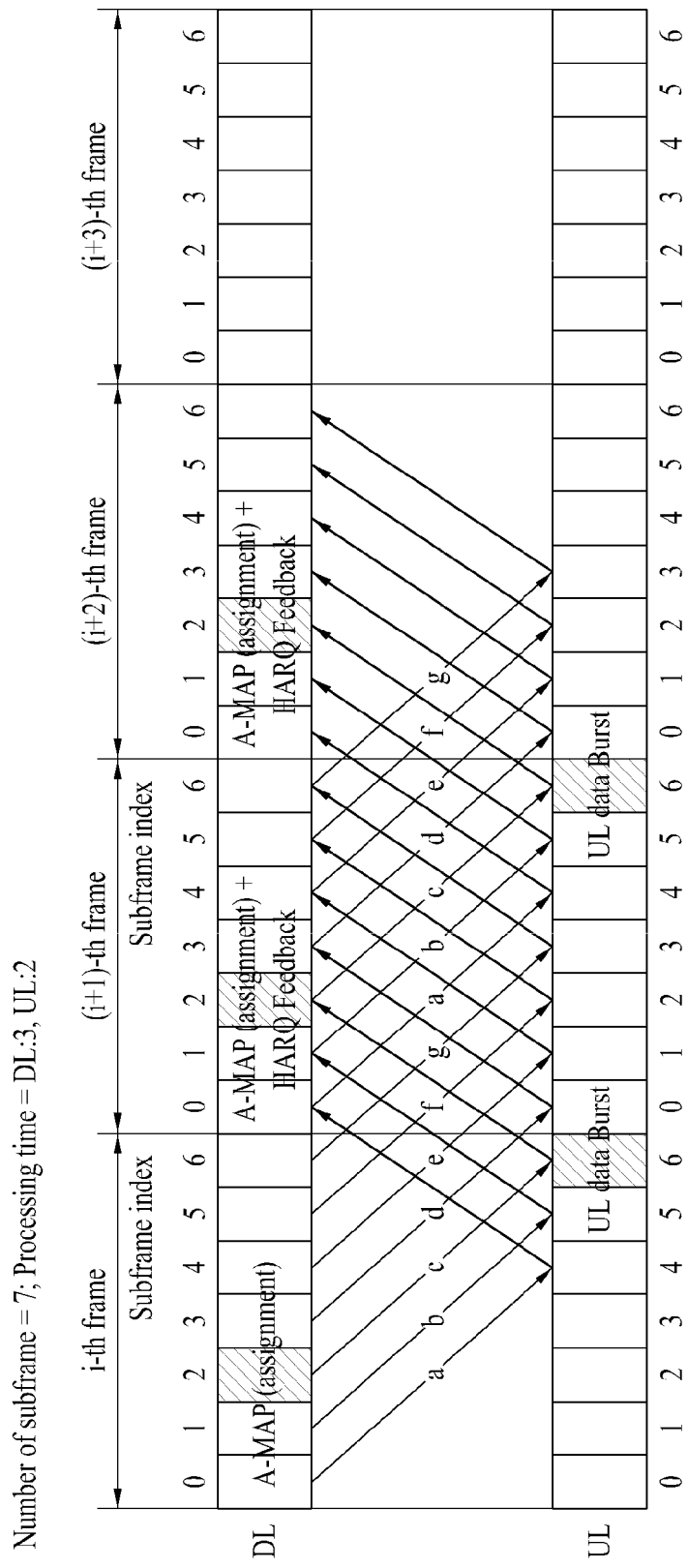
FIG. 13 is a diagram for UL HARQ timing in FDD system having one frame include 7 subframes in accordance with UL HARQ timing according to a $4^{th}$ embodiment of the present invention.

FIG. 13 is a diagram for UL HARQ timing in FDD system having one frame include 7 subframes in accordance with UL HARQ timing according to a $4^{th}$ embodiment of the present invention.

Referring to FIG. 13, assume that a processing time is an interval amounting to 3 subframes. A mobile station receives a UL Assignment A-MAP IE in each subframe of a DL $i^{th}$ frame. In consideration of a processing time that is the time necessary for the mobile station to process a data burst (HARQ subpacket) transmission, the mobile station transmits UL HARQ subpacket in subframes including a $5^{th}$ subframe of the $i^{th}$ frame to a $4^{th}$ subframe of an $(i+1)^{th}$ frame. And, In consideration of a processing time taken to process a data reception of a base station in response to a UL HARQ subpacket transmission of the mobile station, the base station transmits DL HARQ feedback in subframes including a $2^{nd}$ subframe of an $(i+1)^{th}$ frame to a $1^{st}$ subframe of an $(i+2)^{th}$ frame. In doing so, if the DL HARQ feedbacks transmitted by the base station are all NACK signals, the mobile station may be able to retransmit the UL HARQ subpacket in subframes including a $5^{th}$ subframe of the $(i+2)^{th}$ frame to a $4^{th}$ subframe of an $(i+3)^{th}$ frame. In particular, the mobile station retransmits the UL HARQ subpacket in a subframe having the same index of a subframe used in transmitting the UL HARQ subpacket initially.

Although the processing time is the interval amounting to 3 subframes in the description with reference to FIG. 13, it is apparent that the same principle applies despite that the processing time varies.

$5^{th}$ Embodiment of UL HARQ Timing

In UL HARQ timing according to a $5^{th}$ embodiment of the present invention, the UL HARQ timing may apply to a case that a processing time in DL differs from a processing time in UL.

In UL HARQ timing according to a $5^{th}$ embodiment of the present invention, in consideration of a processing time in DL differs and a processing time in UL, if an HARQ link with a corresponding subframe meets the processing time, HARQ scheme is performed in a frame to which the corresponding subframe belongs. Otherwise, the HARQ scheme is performed using a subframe belonging to a next frame. This is described with reference to FIG. 14 as follows.

Figure 14:
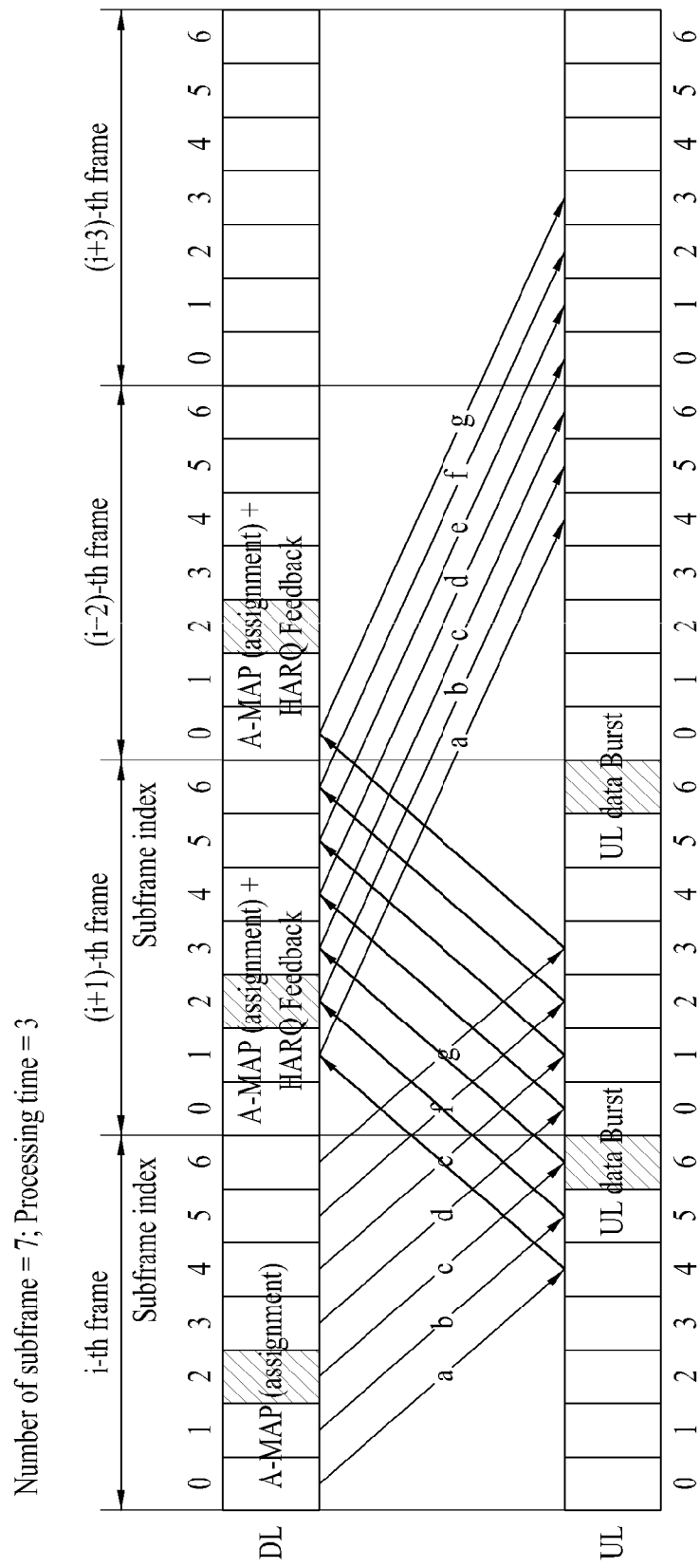
FIG. 14 is a diagram for UL HARQ timing in FDD system having one frame include 7 subframes in accordance with UL HARQ timing according to a $5^{th}$ embodiment of the present invention.

FIG. 14 is a diagram for UL HARQ timing in FDD system having one frame include 7 subframes in accordance with UL HARQ timing according to a $5^{th}$ embodiment of the present invention.

In the description with reference to FIG. 14, assume that a DL processing time includes an interval amounting to 3 subframes and that a UL processing time includes an interval amounting to 2 subframes. Referring to FIG. 14, a mobile station receives UL Assignment A-MAP IE in each subframe of an $i^{th}$ frame. Since the UL processing time amounts to 2 subframes, a mobile station may be able to transmit UL HARQ subpacket in subframes including a $5^{th}$ subframe of the $i^{th}$ frame to a $4^{th}$ subframe of an $(i+1)^{th}$ frame. Since the DL processing time amounts to 3 subframes, a base station may be able to transmit DL HARQ feedback in response to the UL HARQ subpacket transmission of the mobile station in subframes starting with a $1^{st}$ subframe of the $(i+1)^{th}$ frame.

Hence, the base station may be able to transmit DL HARQ feedback using a subframe having the same index of a subframe used in transmitting UL Assignment A-MAP IE.

Although the description with reference to FIG. 14 is based on the assumption that a DL processing time includes an interval amounting to 3 subframes and that a UL processing time includes an interval amounting to 2 subframes, the present embodiment may identically apply to all cases that a DL processing time and a UL processing time differs from each other.

As mentioned in the foregoing description, the various embodiments of the present invention relate to a UL HARQ subpacket transmission timing of a mobile station and a DL HARQ feedback transmission timing of a base station in case that one frame includes subframes of which number is smaller than 8. DL HARQ feedback of the base station may be transmitted in a frame that enables a processing time to be met from a UL subframe having a HARQ timing correspond to a UL Assignment A-MAP IE transmitted subframe.

Although a UL HARQ timing method is taken as an example for the descriptions of various embodiments of the present invention, this method may be usable in a manner of being directly applied to a DL HARQ timing in a DL region.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Accordingly, an apparatus for transmitting and receiving DL HARQ feedback and method thereof are industrially applicable to such a communication system as 3GPP LTE, 3GPP LTE-A, IEEE 802 and the like.

What is claimed is:

1. A method of receiving DL (downlink) HARQ (hybrid automatic retransmission request) feedback at a mobile station using FDD (frequency division duplex) frame, the method comprising:
receiving each UL Assignment A-MAP IE (uplink assignment information element) via each DL subframe of a first frame from a base station;
transmitting UL data corresponding to the received each UL Assignment A-MAP IE via each UL subframe after elapse of a preset processing time necessary for the mobile station process the UL data transmission from the each DL subframe used in receiving the each UL Assignment A-MAP IE; and
receiving the DL HARQ feedback for the each UL data from the base station via each DL subframe having the same index of the each DL subframe used in transmitting the each UL Assignment A-MAP IE in a third frame,
wherein the frame comprises 5 subframes, 6 subframes or 7 subframes.

2. The method of claim 1, wherein the processing time is represented by a subframe number unit.

3. The method of claim 2, wherein the processing time amounts to 3 subframes.

4. The method of claim 3, wherein a bandwidth of the FDD frame is 5 MHz, 10 MHz, 20 MHz, or 8.75 MHz.

5. The method of claim 3, wherein a CP (cyclic prefix) time of the FDD frame is ¼ of a useful symbol time, ⅛ of the useful symbol time or 1/16 of the useful symbol time.

6. A method of transmitting DL (downlink) HARQ (hybrid automatic retransmission request) feedback at a base station using FDD (frequency division duplex) frame, the method comprising:
transmitting each UL Assignment A-MAP IE (uplink assignment information element) via each DL subframe of a first frame to a mobile station;
receiving each UL data corresponding to the transmitted each UL Assignment A-MAP IE via each UL subframe after elapse of a preset processing time necessary for the mobile station process the UL data transmission from the each DL subframe used in transmitting the each UL Assignment A-MAP IE; and
transmitting the DL HARQ feedback for the received each UL data via each DL subframe having the same index of the each UL subframe used in transmitting the each UL Assignment A-MAP IE in a $3^{rd}$ frame,
wherein the frame comprises 5 subframes, 6 subframes or 7 subframes.

7. The method of claim 6, wherein the processing time is represented by a subframe number unit.

8. The method of claim 7, wherein the processing time amounts to 3 subframes.

9. A mobile station for receiving DL (downlink) HARQ (hybrid automatic retransmission request) feedback using FDD (frequency division duplex) frame, the mobile station comprising:
a receiver configured to receive each UL Assignment A-MAP IE (uplink assignment information element) via each DL subframe of a first frame from a base station;
a processor configured to perform a processing for a UL data transmission corresponding to the received each UL Assignment A-MAP IE for a preset processing time;
a transmitter configured to transmit the processed UL data via each corresponding UL subframe after elapse of the preset processing time from the each DL subframe used in receiving the each UL Assignment A-MAP IE; and
wherein the receiver is further configured to receive the DL HARQ feedback for the each UL data from the base station via each DL subframe having the same index of the each DL subframe used in transmitting the each UL Assignment A-MAP IE in a third frame,
wherein the frame comprises 5 subframes, 6 subframes or 7 subframes.

10. The mobile station of claim 9, wherein the processing time is represented by a subframe number unit.

11. The mobile station of claim 10, wherein the processing time amounts to 3 subframes.

12. A base station for transmitting DL (downlink) HARQ (hybrid automatic retransmission request) feedback using FDD (frequency division duplex) frame, the base station comprising:
a transmitter configured to transmit each UL Assignment A-MAP IE (uplink assignment information element) via each DL subframe of a first frame to a mobile station;
a receiver configured to receive each UL data corresponding to the transmitted each UL Assignment A-MAP IE via each UL subframe after elapse of a preset processing time necessary for the mobile station to process the UL data transmission from the each DL subframe used in transmitting the each UL Assignment A-MAP IE; and
a processor configured to control the processing time necessary to process the received each UL data and to transmit the DL HARQ feedback for the each UL data in a subframe having the same index of the each DL subframe used in transmitting the each UL Assignment A-MAP IE; and
wherein the transmitter is further configured to transmit the DL HARQ feedback via each DL subframe of a third frame under the control of the processor,
wherein the frame comprises 5 subframes, 6 subframes or 7 subframes.

13. The base station of claim 12, wherein the processing time is represented by a subframe number unit.

14. The base station of claim 12, wherein the processing time amounts to 3 subframes.

* * * * *